(12) United States Patent
Sasaki et al.

(10) Patent No.: US 9,296,420 B2
(45) Date of Patent: Mar. 29, 2016

(54) VEHICLE

(71) Applicant: Yamaha Hatsudoki Kabushiki Kaisha, Iwata-shi, Shizuoka (JP)

(72) Inventors: Kaoru Sasaki, Shizuoka (JP); Mitsuaki Ohta, Shizuoka (JP)

(73) Assignee: YAMAHA HUTSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/652,870

(22) PCT Filed: Dec. 18, 2013

(86) PCT No.: PCT/JP2013/083923
§ 371 (c)(1),
(2) Date: Jun. 17, 2015

(87) PCT Pub. No.: WO2014/098137
PCT Pub. Date: Jun. 26, 2014

(65) Prior Publication Data
US 2015/0298736 A1 Oct. 22, 2015

(30) Foreign Application Priority Data

Dec. 18, 2012 (JP) ................................. 2012-276254
Jul. 1, 2013 (JP) ................................. 2013-138485

(51) Int. Cl.
*B60R 21/00* (2006.01)
*B62D 9/02* (2006.01)
(Continued)

(52) U.S. Cl.
CPC .. *B62D 9/02* (2013.01); *B60G 3/20* (2013.01); *B62D 25/16* (2013.01); *B62J 15/00* (2013.01);
(Continued)

(58) Field of Classification Search
USPC ............... 280/5.509, 93.502, 93.508, 93.511, 280/124.103; 180/210
See application file for complete search history.

(56) References Cited

U.S. PATENT DOCUMENTS 4,351,410 A * 9/1982 Townsend ................ B62D 9/02
180/210
7,073,806 B2 7/2006 Bagnoli
(Continued)

FOREIGN PATENT DOCUMENTS

CN 102762440 A 10/2012
DE 101 01 847 A1 7/2002
(Continued)

OTHER PUBLICATIONS

Sasaki et al.; "Vehicle"; U.S. Appl. No. 14/652,871, filed Jun. 17, 2015.
(Continued)

*Primary Examiner* — Toan To
(74) *Attorney, Agent, or Firm* — Keating and Bennett, LLP

(57) ABSTRACT

A right front fender and a left front fender are displaceable relative to a vehicle body frame in accordance with an operation of a link mechanism. At least a portion of the right front fender is disposed above a center in the up-down direction between an upper end of a right front wheel and a lower edge of the link mechanism or a steering mechanism directly above the right front wheel, and is disposed below a right lower edge of a front portion of a link cover portion, as seen from a front in the front-rear direction of the vehicle body frame when the vehicle body frame is in the upright state. At least a portion of the left front fender is disposed above a center in the up-down direction between an upper end of a left front wheel and a lower edge of the link mechanism or the steering mechanism directly above the left front wheel, and is disposed below the left lower edge of the front portion of the link cover portion, as seen from the front when the vehicle body frame is in the upright state.

9 Claims, 20 Drawing Sheets

(51) Int. Cl.
*B62J 15/00* (2006.01)
*B62K 5/05* (2013.01)
*B62K 5/10* (2013.01)
*B62D 25/16* (2006.01)
*B62K 5/027* (2013.01)
*B62K 5/08* (2006.01)
*B62J 17/02* (2006.01)
*B60G 3/20* (2006.01)
*B62J 17/00* (2006.01)
*B62K 21/12* (2006.01)
*B62K 5/00* (2013.01)

(52) U.S. Cl.
CPC ............... *B62J 17/02* (2013.01); *B62K 5/027* (2013.01); *B62K 5/05* (2013.01); *B62K 5/08* (2013.01); *B62K 5/10* (2013.01); *B60G 2200/144* (2013.01); *B60G 2300/122* (2013.01); *B60G 2300/45* (2013.01); *B62J 17/00* (2013.01); *B62K 21/12* (2013.01); *B62K 2005/001* (2013.01)

(56) References Cited

U.S. PATENT DOCUMENTS

| | | | |
|---|---|---|---|
| D547,242 S | 7/2007 | Lambri | |
| D598,328 S | 8/2009 | Lambri | |
| 8,016,302 B1* | 9/2011 | Reeve | B62K 5/05 280/124.103 |
| D656,435 S | 3/2012 | Lambri et al. | |
| 8,141,890 B2* | 3/2012 | Hughes | B60G 21/007 180/210 |
| 8,419,027 B2* | 4/2013 | Ting | B62K 5/02 280/124.103 |
| 2004/0140645 A1* | 7/2004 | Hayashi | B62K 5/05 280/282 |
| 2005/0167174 A1* | 8/2005 | Marcacci | B60G 17/0152 180/76 |
| 2007/0187940 A1 | 8/2007 | Presby | |
| 2008/0023242 A1 | 1/2008 | Lachapelle et al. | |
| 2010/0314852 A1* | 12/2010 | Chin | B62K 13/06 280/209 |
| 2011/0006498 A1* | 1/2011 | Mercier | B62D 9/02 280/124.103 |
| 2012/0312609 A1 | 12/2012 | Takewaka et al. | |
| 2013/0168944 A1 | 7/2013 | Bartolozzi et al. | |
| 2014/0353940 A1 | 12/2014 | Bartolozzi et al. | |
| 2014/0375015 A1* | 12/2014 | Yu | B62K 5/027 280/267 |

FOREIGN PATENT DOCUMENTS

| | | |
|---|---|---|
| DE | 10 2010 052 716 A1 | 6/2011 |
| JP | 05-139357 A | 6/1993 |
| JP | 7-144671 A | 6/1995 |
| JP | 2008-74249 A | 4/2008 |
| JP | 2008-80883 A | 4/2008 |
| JP | 2012-056503 A | 3/2012 |
| TW | 201117997 A1 | 6/2011 |
| TW | 201125770 A1 | 8/2011 |
| TW | 201130675 A1 | 9/2011 |
| TW | 201210882 A1 | 3/2012 |
| WO | 2008/074111 A2 | 6/2008 |
| WO | 2012/007819 A1 | 1/2012 |

OTHER PUBLICATIONS

Official Communication issued in International Patent Application No. PCT/JP2013/083923, mailed on Mar. 18, 2014.

Official Communication issued in corresponding European Patent Application no. 13863771.5, mailed on Dec. 3, 2015.

Official Communication issued in corresponding European Patent Application No. 13 863 771.5, mailed on Dec. 18, 2015.

* cited by examiner

FIG. 19
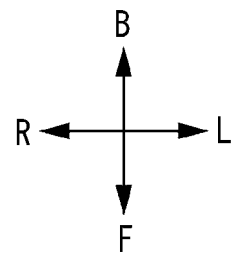
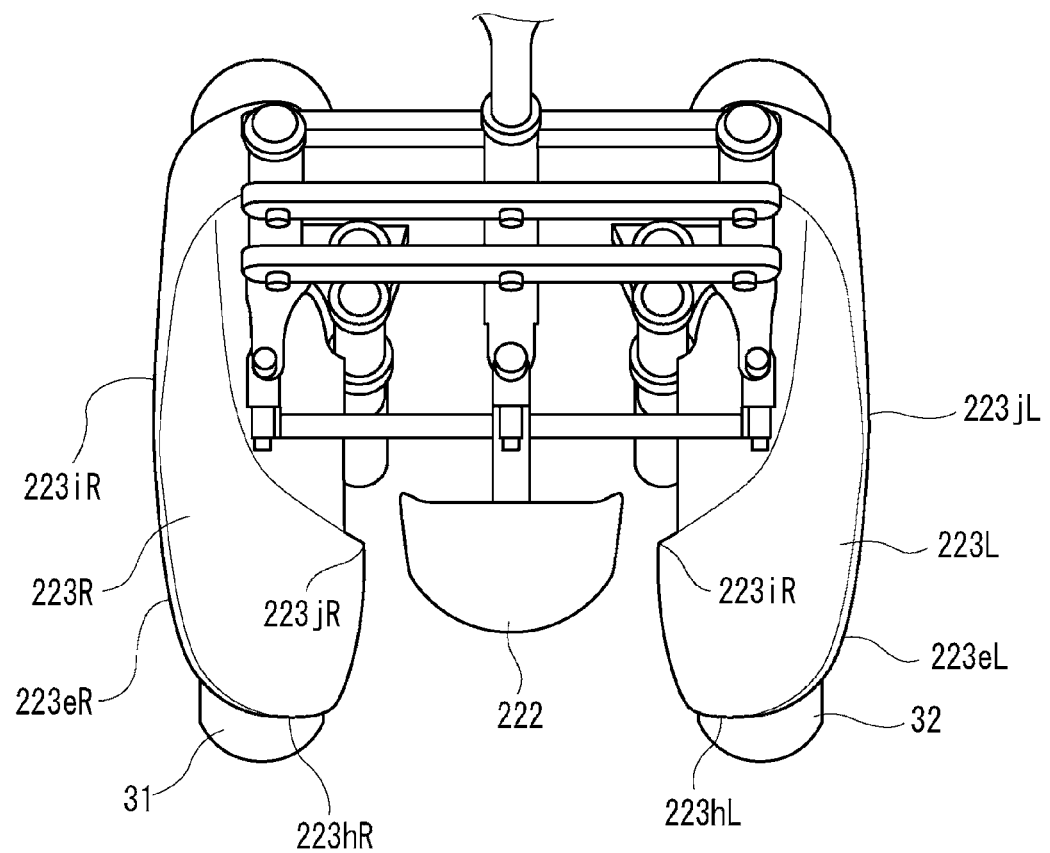

VEHICLE

BACKGROUND OF THE INVENTION

1. Field of the Invention

The present invention relates to a vehicle including a leanable vehicle body frame and two front wheels.

2. Description of the Related Art

A known vehicle includes a vehicle body frame that is leanable leftward or rightward when the vehicle is cornering, and two front wheels that are arranged side by side in a left-right direction of the vehicle body frame (for example, see U.S. Design Pat. No. D547,242 and U.S. Pat. No. 7,073,806).

A front portion of this type of vehicle tends to be large. Thus, in the vehicles disclosed in U.S. Design Pat. No. D547,242 and U.S. Pat. No. 7,073,806, the link mechanism is disposed above the two front wheels so as to reduce the space therebetween, thus realizing a reduction in the size of the front portion of the vehicle in relation to the left-right direction of the vehicle body frame. However, in the vehicle including two front wheels arranged within a narrow space, the vehicle body cover covering the link mechanism extends, when the vehicle is in the upright state, forward of front ends of the two front wheels and below upper ends of the two front wheels. Consequently, it is difficult to reduce the size of the front portion of the vehicle in relation to the front-rear direction of the vehicle body frame.

An attempt was made to reduce the size of the vehicle body cover in relation to the front-rear direction of the vehicle body frame. Specifically, the shape of the vehicle body cover was changed so that a front end of the vehicle body cover was disposed behind the front ends of the two front wheels arranged within a narrow space, and above the upper ends thereof when the vehicle is in the upright state. As the results of tests, it was discovered that incoming objects such as small stones, muddy water and the like that are kicked up by a preceding vehicle occasionally pass through a space between the link mechanism and the right front wheel and a space between the link mechanism and the left front wheel so as to enter an area behind the two front wheels.

SUMMARY OF THE INVENTION

Consequently, preferred embodiments of the present invention provide a front portion of a vehicle including a leanable vehicle body frame and two front wheels smaller in size while ensuring protection against incoming objects.

According to a preferred embodiment of the present invention, a vehicle includes a vehicle body frame; a handlebar configured to turn relative to the vehicle body frame; a vehicle body cover at least a portion of which covers the vehicle body frame; a right front wheel and a left front wheel arranged side by side in a left-right direction of the vehicle body frame; a steering mechanism configured to transmit a turning motion of the handlebar to the right front wheel and the left front wheel; and a link mechanism disposed above the right front wheel and the left front wheel, and configured to cause the vehicle body frame to lean relative to a vertical direction by changing positions of the right front wheel and the left front wheel relative to the vehicle body frame; wherein the vehicle body cover includes a link cover portion covering at least a portion of the link mechanism, configured so as not to be displaced relative to the vehicle body frame, including a front portion disposed forward of respective rear ends of the right front wheel and the left front wheel in a front-rear direction of the vehicle body frame as seen from the front in the front-rear direction of the vehicle body frame when the vehicle body frame is in an upright state, and arranged such that a right lower edge of the front portion directly above the right front wheel is disposed above a lower end of the link mechanism or the steering mechanism in an up-down direction of the vehicle body frame, and such that a left lower edge of the front portion directly above the left front wheel is disposed above a lower end of the link mechanism or the steering mechanism in the up-down direction of the vehicle body frame; a right protecting portion configured to be displaced relative to the vehicle body frame in accordance with an operation of the link mechanism, at least a portion of which is disposed above a center in the up-down direction of the vehicle body frame between an upper end of the right front wheel and a lower edge of the link mechanism or the steering mechanism directly above the right front wheel, and disposed below the right lower edge of the front portion of the link cover portion as seen from the front in the front-rear direction of the vehicle body frame when the vehicle body frame is in the upright state; and a left protecting portion configured to be displaced relative to the vehicle body frame in accordance with the operation of the link mechanism, at least a portion of which is disposed above a center in the up-down direction of the vehicle body frame between an upper end of the left front wheel and a lower edge of the link mechanism or the steering mechanism directly above the left front wheel, and disposed below the left lower edge of the front portion of the link cover portion as seen from the front in the front-rear direction of the vehicle body frame when the vehicle body frame is in the upright state.

In the vehicle including the leanable vehicle body frame and the link mechanism, the right front wheel and the left front wheel each have a wide movable range. This is because the right front wheel and the left front wheel are turned when steered, are displaced in the up-down direction of the vehicle body frame as the right shock absorber and the left shock absorber extend or contract, and are displaced in the up-down direction of the vehicle body frame as the link mechanism operates. A vehicle body cover, that is provided so as not to be displaced relative to the vehicle body frame, preferably covers a long distance with respect to the right front wheel and the left front wheel, each of which has such a wide movable range, so as to avoid interference therewith.

When the front end of the vehicle body cover is disposed behind the respective front ends of the right front wheel and the left front wheel provided within a narrow space so as to make the vehicle body cover smaller in relation to the front-rear direction of the vehicle body frame, the vehicle body frame is likely to interfere with the right front wheel and the left front wheel. Thus, the lower end of the front portion of the vehicle body cover preferably is spaced a significant distance away from the respective upper ends of the right front wheel and the left front wheel so as to avoid interference.

However, by enlarging the spaces between the lower edge of the front portion of the vehicle body cover and the respective upper ends of the right front wheel and the left front wheel provided within a narrow space, incoming objects tend to easily pass through such spaces. When attempting to prevent the entrance of incoming objects into these areas while avoiding interference with the right front wheel and the left front wheel, the vehicle body cover preferably projects forward a significant distance, as a result of which a reduction in size of the vehicle body cover in relation to the front-rear direction of the vehicle body frame is reduced or prevented.

Conditions in which the vehicle is subjected to incoming objects has been analyzed for vehicle body covers having different shapes. As the results of this analysis, it has been discovered that incoming objects occasionally pass through the space between the upper edge of the right front wheel and the lower edge of the link mechanism or the steering mechanism that is directly above the right front wheel, and the space between the upper edge of the left front wheel and the lower edge of the link mechanism or the steering mechanism that is directly above the left front wheel, as seen from the front side in the front-rear direction of the vehicle body frame when the vehicle body frame is in the upright state. Additionally, it has also been discovered that the incoming objects occasionally reach an area behind the right front wheel and the left front wheel in relation to the front-rear direction of the vehicle body frame.

Further, it has also been discovered that the vehicle body cover provides both the function of covering at least a portion of the link mechanism and the function of preventing incoming objects from entering an area behind the right front wheel and the left front wheel. Then, the vehicle body cover is divided in accordance with the functions thereof into a portion (the link cover portion) that covers at least a portion of the link mechanism and a portion (the right protecting portion and the left protecting portion) that prevents incoming objects from entering deeply to the area behind the right front wheel and the left front wheel. Then, suitable positions and shapes for each of the individual functional portions were considered.

In the vehicle including the leanable vehicle body frame and the link mechanism, the right front wheel and the left front wheel each have a wide movable range. Consequently, the positions and sizes of the areas between the link mechanism and the right front wheel and between the link mechanism and the left front wheel are changes in accordance with the operation of the link mechanism. When the configuration in which the portion that defines and serves as the protecting portion is not displaced relative to the vehicle body frame, the protecting portion preferably covers the entire areas that change positions to shield the areas against the incoming objects. This enlarges the portion that defines and serves as the protecting portion.

The link cover portion is provided so as not to be displaced relative to the vehicle body frame and covers at least a portion of the link mechanism. In the link cover portion, at least a portion of the function to prevent incoming objects from entering an area behind the right front wheel and the left front wheel is divided into the right protecting portion and the left protecting portion. Thus, the degree of freedom in design of the link cover portion is enhanced. In addition, by separating a portion of the functions that the link cover portion has to perform, the link cover portion is made smaller. Specifically, the link cover portion includes the front portion that is disposed forward of the respective rear ends of the right front wheel and the left front wheel in the front-rear direction of the vehicle body frame. As seen from the front in the front-rear direction of the vehicle body frame when the vehicle body frame is in the upright state, the right lower edge of the front portion that is directly above the right front wheel is disposed above the lower end of the link mechanism or the steering mechanism in the up-down direction of the vehicle body frame, and the left lower edge of the front portion that is in the upper side of the left front wheel is disposed above the lower end of the link mechanism or the steering mechanism in the up-down direction of the vehicle body frame. More specifically, the vehicle body cover is made smaller in size in relation to the left-right direction of the vehicle body frame by narrowing the space between the right front wheel and the left front wheel. In addition, the vehicle body cover is made smaller in size in relation to the front-rear direction of the vehicle body frame.

A relatively large space is provided between the right lower edge of the front portion of the link cover portion and the right front wheel and between the left lower edge of the front portion of the link cover portion and the left front wheel by making the link cover portion smaller in size in relation to the front-rear direction of the vehicle body frame. However, the right protecting portion and the left protecting portion are configured to be displaced relative to the vehicle body frame in accordance with the operation of the link mechanism. More specifically, even though the positions and sizes of the areas between the link mechanism and the right front wheel and between the link mechanism and the left front wheel change in accordance with the operation of the link mechanism, the right protecting portion and the left protecting portion is caused to move according to the changes in the positions and sizes of the areas.

In addition, at least a portion of the right protecting portion is disposed above the center in the up-down direction of the vehicle body frame between the upper end of the right front wheel and the lower edge of the link mechanism or the steering mechanism that is directly above the right front wheel, and is disposed below the right lower edge of the front portion of the link cover portion, as seen from the front in the front-rear direction of the vehicle body frame when the vehicle body frame is in the upright state. At least a portion of the left protecting portion is disposed above the center in the up-down direction of the vehicle body frame between the upper end of the left front wheel and the lower edge of the link mechanism or the steering mechanism that is directly above the left front wheel, and is disposed below the left lower edge of the front portion of the link cover portion, as seen from the front in the front-rear direction of the vehicle body frame when the vehicle body frame is in the upright state. Accordingly, the right protecting portion and the left protecting portion easily prevents incoming objects from entering an area behind the right front wheel and the left front wheel. Consequently, the right protecting portion and the left protecting portion are made smaller in size even though the right protecting portion and the left protecting portion have the same protecting function as that of the protecting portion that is not displaced relative to the vehicle body frame irrespective of how the link mechanism operates. With this configuration, even though the right protecting portion and the left protecting portion are made smaller in size, it is possible to prevent incoming objects from entering an area behind the right front wheel and the left front wheel.

Thus, the link cover portion is smaller in size by separating at least a portion of the function of reducing or prevented incoming objects from entering an area behind the right front wheel and the left front wheel. In addition, the link cover portion is also smaller due to the right protecting portion and the left protecting portion each being displaced relative to the vehicle body frame in accordance with the operation of the link mechanism, thus preventing incoming objects from entering an area behind the right front wheel and the left front wheel. Consequently, the front portion of the vehicle is made smaller in size while ensuring the protecting function of the vehicle including the leanable vehicle body frame and the two front wheels against incoming objects.

Preferably, the vehicle is configured such that at least a portion of the right protecting portion is disposed below the center in the up-down direction of the vehicle body frame between the upper end of the right front wheel and the lower edge of the link mechanism or the steering mechanism directly above the right front wheel, and is disposed above an upper edge of the right front wheel as seen from the front in the front-rear direction of the vehicle body frame when the vehicle body frame is in the upright state; and at least a portion of the left protecting portion is disposed below the center in the up-down direction of the vehicle body frame between the upper end of the left front wheel and the lower edge of the link mechanism or the steering mechanism directly above the left front wheel, and is disposed above an upper edge of the left front wheel as seen from the front in the front-rear direction of the vehicle body frame when the vehicle body frame is in the upright state.

According to the arrangement described above, at least a portion of the right protecting portion is disposed below the center in the up-down direction of the vehicle body frame between the upper end of the right front wheel and the lower edge of the link mechanism or the steering mechanism that is directly above the right front wheel, and is disposed above the upper edge of the right front wheel as seen from the front in the front-rear direction of the vehicle body frame when the vehicle body frame is in the upright state. Since the right protecting portion that is displaced relative to the vehicle body frame is disposed both above and below the center, the protecting function is ensured even though the right protecting portion is small. Here, the portion below the center is spaced farther apart from the link cover portion that is not displaced relative to the vehicle body frame than the portion above the center. Accordingly, even though portion of the right protecting portion is disposed below the center, interference of the right protection portion with the link cover is avoided.

In addition, at least a portion of the left protecting portion is disposed below the center in the up-down direction of the vehicle body frame between the upper end of the left front wheel and the lower edge of the link mechanism or the steering mechanism that is directly above the left front wheel, and is disposed above the upper edge of the left front wheel as seen from the front in the front-rear direction of the vehicle body frame when the vehicle body frame is in the upright state. Since the left protecting portion that is displaced relative to the vehicle body frame is disposed both above and below the center, the protecting function is ensured even though the left protecting portion is small. Here, the portion below the center is spaced farther apart from the link cover portion that is not displaced relative to the vehicle body frame than the portion above the center. Accordingly, even though portion of the left protecting portion is disposed below the center, interference of the left protecting portion with the link cover is avoided.

Consequently, the front portion of the vehicle is made smaller in size while ensuring the protecting function of the vehicle including the leanable vehicle body frame and the two front wheels against incoming objects.

Preferably, the vehicle is configured such that at least a portion of the right protecting portion is disposed behind a front end of the right front wheel in the front-rear direction of the vehicle body frame when the vehicle body frame is in the upright state; and at least a portion of the left protecting portion is disposed behind a front end of the left front wheel in the front-rear direction of the vehicle body frame when the vehicle body frame is in the upright state.

According to the arrangement described above, since the right protecting portion is disposed behind the front end of the right front wheel, the right protecting portion is made smaller in size while preventing incoming objects from entering an area behind the right front wheel. Additionally, the right front wheel and the right protecting portion are closer to each other while avoiding interference of the right front wheel that is displaced with the right protecting portion. This enables the vehicle including the right protecting portion to be made smaller in size.

In addition, since the left protecting portion is disposed behind the front end of the left front wheel, the left protecting portion is made smaller in size while preventing incoming objects from entering an area behind the left front wheel. Additionally, the left front wheel and the left protecting portion are closer to each other while avoiding interference of the left front wheel that is displaced with the left protecting portion. This enables the vehicle including the left protecting portion to be made smaller in size.

Consequently, the front portion of the vehicle is made smaller in size while ensuring the protecting function of the vehicle including the leanable vehicle body frame and the two front wheels against incoming objects.

Preferably, the vehicle is configured such that at least a portion of the right protecting portion is disposed forward of a rear end of the right front wheel in the front-rear direction of the vehicle body frame when the vehicle body frame is in the upright state; and at least a portion of the left protecting portion is disposed forward of a rear end of the left front wheel in the front-rear direction of the vehicle body frame when the vehicle body frame is in the upright state.

According to the arrangement described above, since the right protecting portion is disposed forward of the rear end of the right front wheel, the right protecting portion is made smaller in size while preventing incoming objects from entering an area behind the right front wheel. Additionally, the right front wheel and the right protecting portion are closer to each other while avoiding interference of the right front wheel that is displaced with the right protecting portion. This enables the vehicle including the right protecting portion to be made smaller in size.

Since the left protecting portion is disposed forward of a rear end of the left front wheel, the left protecting portion is made smaller in size while preventing incoming objects from entering an area behind the left front wheel. Additionally, the left front wheel and the left protecting portion are closer to each other while avoiding interference of the left front wheel that is displaced with the left protecting portion. This enables the vehicle including the left protecting portion to be made smaller in size.

Consequently, the front portion of the vehicle is made smaller in size while ensuring the protecting function of the vehicle including the leanable vehicle body frame and the two front wheels against incoming objects.

Preferably, the vehicle is configured such that the steering mechanism includes a right shock absorber supporting the right front wheel at a lower portion thereof, and configured to buffer displacement of the right front wheel in the up-down direction of the vehicle body frame relative to an upper portion thereof; a left shock absorber supporting the left front wheel at a lower portion thereof, and configured to buffer displacement of the left front wheel in the up-down direction of the vehicle body frame relative to an upper portion thereof; a right bracket to which the upper portion of the right shock absorber is fixed; a left bracket to which the upper portion of the left shock absorber is fixed; a steering shaft to which the handlebar is attached; and a transmission mechanism configured to transmit a turning motion of steering shaft to the right bracket and the left bracket; wherein the right protecting portion is fixed to any one of the link mechanism, the right shock absorber, the right bracket, and the transmission mechanism; and the left protecting portion is fixed to any one of the link mechanism, the left shock absorber, the left bracket, and the transmission mechanism.

According to the configuration described above, since the right protecting portion and the left protecting portion are directly moved in accordance with the operation of the link mechanism, the right protecting portion and the left protecting portion are easily made smaller in size. Consequently, the front portion of the vehicle is made smaller in size while ensuring the protecting function of the vehicle including the leanable vehicle body frame and the two front wheels against incoming objects.

Preferably, the vehicle is configured such that the right protecting portion is fixed to the upper portion of the right shock absorber; and the left protecting portion is fixed to the upper portion of the left shock absorber.

According to the configuration described above, even though the right front wheel and the left front wheel are displaced in the up-down direction of the vehicle body frame in accordance with the operation of the right shock absorber and the left shock absorber, the right protecting portion and the left protecting portion are prevented from being displaced in the same direction in association with the displacement of the right front wheel and the left front wheel in the up-down direction of the vehicle body frame. This enables the right protecting portion and the left protecting portion to be made even smaller in size. Consequently, the front portion of the vehicle is made smaller in size while ensuring the protecting function of the vehicle including the leanable vehicle body frame and the two front wheels against incoming objects.

Preferably, the vehicle is configured such that a front edge of the right protecting portion is inclined such that at least one of an upper end thereof and a lower end thereof is located behind a front end thereof as seen from a side of the vehicle body frame when the vehicle body frame is in the upright state; and a front edge of the left protecting portion is inclined such that at least one of an upper end thereof and a lower end thereof is located behind a front end thereof as seen from the side of the vehicle body frame when the vehicle body frame is in the upright state.

According to the configuration described above, incoming objects are deflected in the up-down direction of the vehicle body frame along the inclined portions of the right protecting portion and the left protecting portion. With this configuration, it is possible to prevent incoming objects from entering an area behind the right front wheel and the left front wheel. This enables the right protecting portion and the left protecting portion to be made even smaller in size. Consequently, the front portion of the vehicle is made smaller in size while ensuring the protecting function of the vehicle including the leanable vehicle body frame and the two front wheels against incoming objects.

Preferably, the vehicle is configured such that a front edge of the right protecting portion is inclined such that at least one of a right end thereof and a left end thereof is located behind a front end thereof as seen from above of the vehicle body frame when the vehicle body frame is in the upright state; and a front edge of the left protecting portion is inclined such that at least one of a right end thereof and a left end thereof is located behind a front end thereof as seen from above the vehicle body frame when the vehicle body frame is in the upright state.

According to the configuration described above, incoming objects are deflected in the left-right direction of the vehicle body frame along the inclined portions of the right protecting portion and the left protecting portion. With this configuration, it is possible to prevent incoming objects from entering an area behind the right front wheel and the left front wheel.

This enables the right protecting portion and the left protecting portion to be made even smaller in size. Consequently, the front portion of the vehicle is made smaller in size while ensuring the protecting function of the vehicle including the leanable vehicle body frame and the two front wheels against incoming objects.

Preferably, the vehicle is configured such that the right protecting portion covers at least a portion of an upper surface of the right front wheel, and provides at least a portion of a fender function that prevents objects including muddy water kicked up by the right front wheel from scattering; and the left protecting portion covers at least a portion of an upper surface of the left front wheel, and provides at least a portion of fender function that prevents objects including muddy water kicked up by the left front wheel from scattering.

According to the configuration described above, it is possible to prevent incoming objects from entering an area behind the right front wheel and the left front wheel. It is therefore possible to make the right protecting portion and the left protecting portion, which provide a function of preventing incoming objects from entering an area behind the right front wheel and the left front wheel, smaller in size. Further, portion of the fender function for the right front wheel is provided by the right protecting portion, and portion of the fender function for the left front wheel is provided by the left protecting portion, such that the degree of freedom in designing the right protecting portion, a right front fender, the left protecting portion, and a left front fender is improved. Additionally, with the configuration described above, portion of the function of the right protecting portion is provided by the right front fender for the right front wheel, and portion of the function of the left protecting portion is provided by the left front fender for the left front wheel, such that the degree of freedom in designing the right protecting portion, a right front fender, the left protecting portion, and a left front fender is improved. According to this configuration, compared with a case where individual elements are prepared for each function, the overall configuration is made smaller while ensuring the same functions. Consequently, the front portion of the vehicle is made smaller in size while ensuring the protecting function of the vehicle including the leanable vehicle body frame and the two front wheels against incoming objects.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 19 is a view illustrating the shapes of the right protecting portion and the left protecting portion provided on the vehicle shown in FIG. 1.

DETAILED DESCRIPTION OF THE PREFERRED EMBODIMENTS

Figure 1:
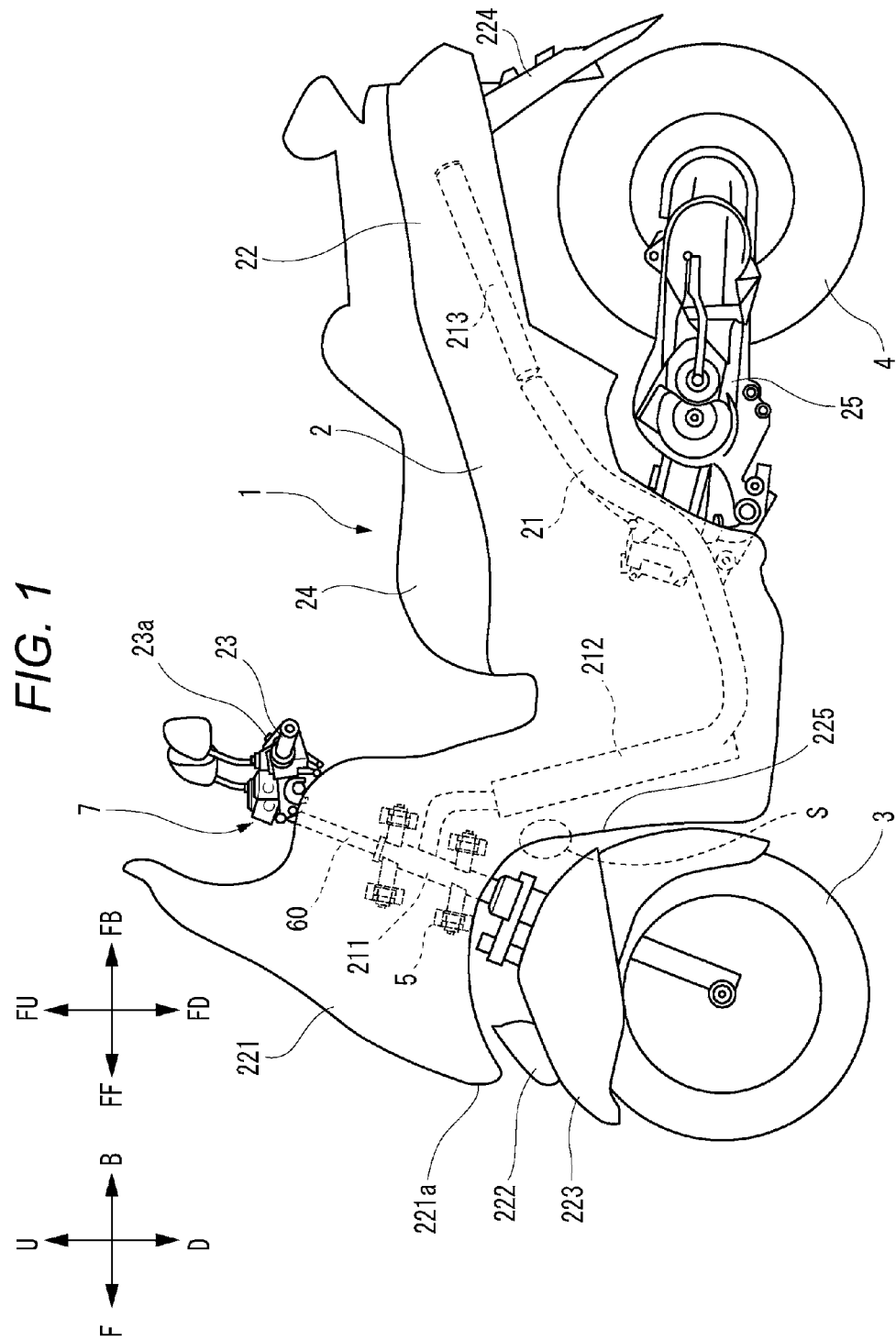
FIG. 1 is a left side view wherein an entire vehicle according to a preferred embodiment of the present invention is seen from a left side thereof.

In the vehicle including the leanable vehicle body frame and the link mechanism, the right front wheel and the left front wheel each have a wide movable range. This is because the right front wheel and the left front wheel are turned when steered, are displaced in the up-down direction of the vehicle body frame as the right shock absorber and the left shock absorber extend or contract, and are displaced in the up-down direction of the vehicle body frame as the link mechanism operates. A vehicle body cover, which is configured so as not to be displaced relative to the vehicle body frame, preferably covers a long distance with respect to the right front wheel and the left front wheel, each of which has a wide movable range, so as to avoid interference therewith.

In the event that a front end of the vehicle body cover is disposed behind respective front ends of the right front wheel and the left front wheel arranged within a narrow space in order to make the vehicle body cover smaller in size in relation to the front-rear direction of the vehicle body frame, the front end of the vehicle body cover comes into interference with the right front wheel and the left front wheel. Thus, the lower end of the front portion of the vehicle body cover preferably is spaced far apart from the respective upper ends of the right front wheel and the left front wheel so as to avoid interference therewith.

Then, considering a configuration that prevents incoming objects from entering an area behind the right front wheel and the left front wheel, while the vehicle is in the upright state, the front end of the vehicle body cover is disposed behind the respective front ends of the right front wheel and the left front wheel, and is disposed above the respective upper ends of the right front wheel and the left front wheel which are arranged within a narrow space. However, since a protecting portion preferably is configured to avoid interference with the fright front wheel and the left front wheel, the dimensions of the protecting portion are limited in relation to the left-right direction and the up-down direction of the vehicle body frame. Thus, a sufficient protecting effect has not yet been obtained.

Then, the vehicle body cover is divided in accordance with the functions thereof into the portion (the link cover portion) that essentially serves to cover at least a portion of the link mechanism and the portion (the right protecting portion and the left protecting portion) that defines and serves to prevent incoming objects from entering into an area behind the right front wheel and the left front wheel. Then, suitable positions and shapes for each of the individual functional portions was considered.

In the vehicle including the leanable vehicle body frame and the link mechanism, the right front wheel and the left front wheel each have a wide movable range. Consequently, the positions and sizes of the areas, which are between the link mechanism and the right front wheel and between the link mechanism and the left front wheel, change largely in accordance with the operation of the link mechanism. When a portion that defines and serves as a protecting portion is configured so as not to be displaced relative to the vehicle body frame, the protecting portion preferably is configured to cover the entire areas that change positions. This enlarges the portions that define and serve as the protecting portions.

The link cover portion is configured so as not to be displaced relative to the vehicle body frame and covers at least a portion of the link mechanism. In the link cover portion, at least a portion of which has the function to prevent incoming objects from entering an area behind the right front wheel and the left front wheel, is divided into the right protecting portion and the left protecting portion. Thus, the degree of freedom in design of the link cover is enhanced. In addition, by separating the functions that the link cover portion provides, the link cover portion is made smaller. Specifically, the link cover portion includes a front portion that is disposed forward of respective rear ends of the right front wheel and the left front wheel in the front-rear direction of the vehicle body frame. As seen from the front in the front-rear direction of the vehicle body frame when the vehicle body frame is in the upright state, the right lower edge of the front portion that is directly above the right front wheel is disposed above the lower end of the link mechanism or the steering mechanism in the up-down direction of the vehicle body frame, and the left lower edge of the front portion that is in the upper side of the left front wheel is disposed above the lower end of the link mechanism or the steering mechanism in the up-down direction of the vehicle body frame. More specifically, the vehicle body cover is made smaller in size in relation to the left-right direction of the vehicle body frame by narrowing the space between the right front wheel and the left front wheel. In addition, the vehicle body cover is made smaller in size in relation to the front-rear direction of the vehicle body frame.

A relatively large space is provided between the right lower edge of the front portion of the link cover portion and the right front wheel and between the left lower edge of the front portion of the link cover portion and the left front wheel by making the link cover portion smaller in size in relation to the front-rear direction of the vehicle body frame. However, the right protecting portion and the left protecting portion are provided on the vehicle so as to be displaced relative to the vehicle body frame in accordance with the operation of the steering mechanism. More specifically, even though the positions and sizes of the areas between the link mechanism and the right front wheel and between the link mechanism and the left front wheel change in accordance with the operation of the link mechanism, the right protecting portion and the left protecting portion is caused to move according to the changes in the positions and sizes of the areas. Consequently, the right protecting portion and the left protecting portion that are provided on the vehicle is made smaller in size even though the right protecting portion and the left protecting portion are provided with the same protecting function as that of the protecting portion that is provided so as not to be displaced relative to the vehicle body frame irrespective of how the link mechanism operates. With this configuration, even though the right protecting portion and the left protecting portion are made smaller in size, it is possible to prevent incoming objects from entering an area behind the right front wheel and the left front wheel.

Thus, as has been described above, the link cover portion is smaller in size by separating at least a portion of the function to prevent incoming objects from entering an area behind the right front wheel and the left front wheel. In addition, the link cover portion is also smaller by providing the right protecting portion and the left protecting portion both of which function to prevent incoming objects from entering an area behind the right front wheel and the left front wheel so as to be displaced relative to the vehicle body frame in accordance with the operation of the steering mechanism. Consequently, the front portion of the vehicle is made smaller in size while ensuring the protecting function of the vehicle including the leanable vehicle body frame and the two front wheels against incoming objects.

Referring to the accompanying drawings, preferred embodiments of the present invention will be described below in detail.

In the accompanying drawings, an arrow F denotes a forward direction of a vehicle. An arrow B denotes a rearward direction of the vehicle. An arrow U denotes an upward direction of the vehicle. An arrow D denotes a downward direction of the vehicle. An arrow R denotes a rightward direction of the vehicle. An arrow L denotes a leftward direction of the vehicle.

A vehicle turns by causing a vehicle body frame to lean leftward or rightward of the vehicle in relation to a vertical direction. Then, in addition to the directions based on the vehicle, directions based on the vehicle body frame are determined. In the accompanying drawings, an arrow FF denotes a forward direction of the vehicle body frame. An arrow FB denotes a rearward direction of the vehicle body frame. An arrow FU denotes an upward direction of the vehicle body frame. An arrow FD denotes a downward direction of the vehicle body frame. An arrow FR denotes a rightward direction of the vehicle body frame. An arrow FL denotes a leftward direction of the vehicle body frame.

In this specification, a "front-rear direction of the vehicle body frame," a "left-right direction of the vehicle body frame," and an "up-down direction of the vehicle body frame" mean, respectively, a front-rear direction, a left-right direction and an up-down direction of the vehicle body frame as seen from a rider who drives the vehicle. "Sideways of the vehicle body frame" means to the right or left of the vehicle body frame.

In this specification, an expression "extending in the front-rear direction of the vehicle body frame" includes a direction which is inclined in relation to the front-rear direction of the vehicle body frame and means that it extends in a direction closer to the front-rear direction of the vehicle body frame than the left-right direction and up-down direction of the vehicle body frame.

In this specification, an expression "extending in the left-right direction of the vehicle body frame" includes a direction which is inclined in relation to the left-right direction of the vehicle body frame and indicates that it extends in a direction closer to the left-right direction of the vehicle body frame than the front-rear direction and up-down direction of the vehicle body frame.

In this specification, an expression "extending in the up-down direction of the vehicle body frame" includes a direction which is inclined in relation to the up-down direction of the vehicle body frame and indicates that it extends in a direction closer to the up-down direction of the vehicle body frame than the left-right direction and front-rear direction of the vehicle body frame.

In this specification, an "upright state of the vehicle body frame" indicates a state that the vehicle is not steered at all, and a state that the up-down direction of the vehicle body frame coincides with the vertical direction. In this state, a direction based on the vehicle coincides with a direction based on the vehicle body frame. When the vehicle is turned by causing the vehicle body frame to lean leftward or rightward in relation to the vertical direction, the left-right direction of the vehicle does not coincide with the left-right direction of the vehicle body frame. In addition, the up-down direction of the vehicle does not coincide with the up-down direction of the vehicle body frame, either. However, the front-rear direction of the vehicle coincides with the front-rear direction of the vehicle body frame.

Referring to FIGS. 1 to 8 and FIGS. 13A to 19, a vehicle 1 according to various preferred embodiments of the present invention will be described. The vehicle 1 is a vehicle including a leanable vehicle body frame and two front wheels.

FIG. 1 is a left side view wherein the entire vehicle 1 is seen from a left side thereof. The vehicle 1 includes a vehicle main body 2, a pair of left and right front wheels 3, a rear wheel 4, a link mechanism 5, and a steering mechanism 7.

The vehicle main body 2 includes a vehicle body frame 21, a vehicle body cover 22, a seat 24, and a power unit 25. In FIG. 1, the vehicle body frame 21 is in an upright state. The following description referring to FIG. 1 will be based on the premise that the vehicle body frame 21 is in the upright state.

The vehicle body frame 21 includes a head pipe 211, a down frame 212, and a rear frame 213. In FIG. 1, portions of the vehicle body frame 21 that are concealed by the vehicle body cover 22 are shown by dashed lines. The vehicle body frame 21 supports the seat 24 and the power unit 25. The power unit 25 supports the rear wheel 4. The power unit 25 includes drive source devices such as an engine, an electric motor, a battery and the like and other devices such as a transmission and the like.

The head pipe 211 is disposed at a front portion of the vehicle 1. An upper portion of the head pipe 211 is disposed behind a lower portion of the head pipe 211 as seen from the sides of the vehicle body frame 21.

The down frame 212 is connected to the head pipe 211. The down frame 212 is disposed directly behind the head pipe 211. The down frame 212 extends in the up-down direction of the vehicle body frame 21.

The rear frame 213 is disposed directly behind the down frame 212. The rear frame 213 extends in the front-rear direction of the vehicle body frame 21. The rear frame 213 supports the seat 24 and the power unit 25.

The vehicle body cover 22 includes a front cover 221, a front spoiler 222, a pair of front fenders 223, a rear fender 224, and a leg shield 225. The vehicle body cover 22 is a vehicle-mounted portion that covers at least a portion of elements installed in the vehicle 1 such as the pair of left and right front wheels 3, the vehicle body frame 21, the link mechanism 5 and the like.

The front cover 221 is disposed forward of the seat 24. The front cover 221 covers the link mechanism 5 and at least a portion of the steering mechanism 7. The shape and position of the front cover 221 will be described in detail below.

At least a portion of the front spoiler 222 is disposed directly below the front cover 221. The shape and position of the front spoiler 222 will be described in detail below.

At least a portion of the pair of left and right front fenders 223 are respectively disposed directly below the front cover 221. At least a portion of the pair of left and right front fenders 223 are respectively disposed directly above the pair of left and right front wheels 3. The shapes and positions of the pair of left and right front fenders 223 will be described in detail below.

At least a portion of the rear fender 224 is disposed directly above the rear wheel 4.

The leg shield 225 is disposed in a position where the leg shield 225 covers at least a portion of the legs of a rider. The leg shield 225 is disposed behind the pair of left and right front wheels 3 and ahead of the seat 24.

At least a portion of the pair of left and right front wheels 3 is disposed directly below the head pipe 211. At least a portion of the pair of left and right front wheels 3 is disposed directly below the front cover 221.

At least a portion of the rear wheel 4 is disposed below the seat 24. At least a portion of the rear wheel 4 is disposed directly below the rear fender 224.

Figure 2:
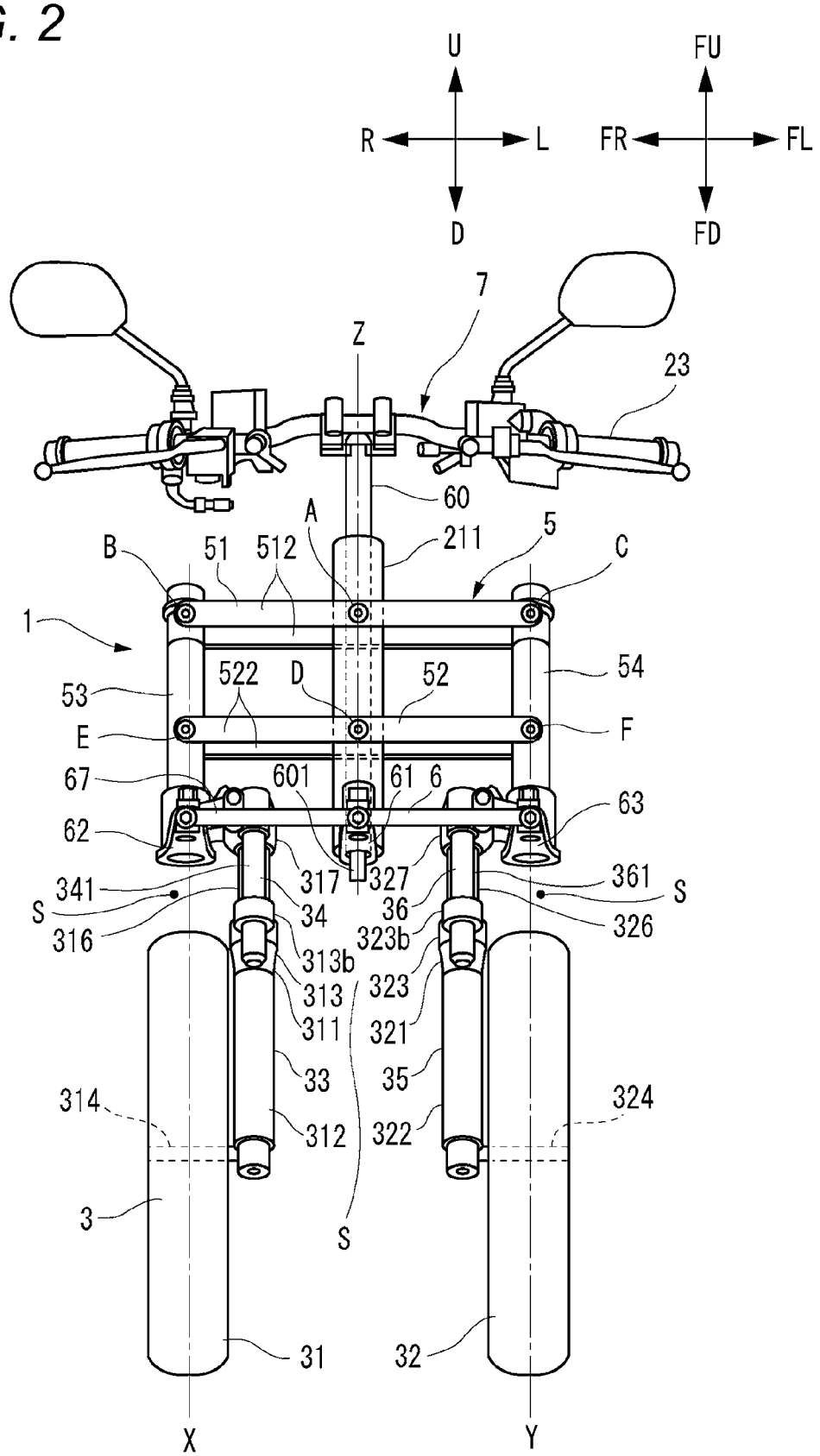
FIG. 2 is a front view wherein a portion of the vehicle shown in FIG. 1 is seen from the front.

FIG. 2 is a front view wherein the front portion of the vehicle 1 is seen from the front of the vehicle body frame 21. In FIG. 2, the vehicle body frame 21 is in the upright state. The following description referring to FIG. 2 will be based on the premise that the vehicle body frame 21 is in the upright state. FIG. 2 shows the front portion of the vehicle 1 when the front cover 221, the front spoiler 222, and the pair of left and right front fenders 223 are removed.

The pair of left and right front wheels 3 includes a right front wheel 31 and a left front wheel 32. The right front wheel 31 is disposed to the right of the head pipe 211 that defines a portion of the vehicle body frame 21. The left front wheel 32 is disposed to the left of the head pipe 211. The right front wheel 31 and the left front wheel 32 are arranged side by side in the left-right direction of the vehicle body frame 21.

The steering mechanism 7 includes a right shock absorber 33, a left shock absorber 35, a right bracket 317, and a left bracket 327.

The right shock absorber 33 includes a right outer tube 312 (one example of a lower portion of the right shock absorber). The right outer tube 312 supports the right front wheel 31. The right outer tube 312 extends in the up-down direction of the vehicle body frame 21. The right outer tube 312 includes a right support shaft 314 at a lower end portion thereof. The right front wheel 31 is supported by the right support shaft 314.

The right shock absorber 33 includes a right inner tube 316 (one example of an upper portion of the right shock absorber). The right inner tube 316 extends in the up-down direction of the vehicle body frame 21. The right inner tube 316 is disposed directly above the right outer tube 312 when the right inner tube 316 is partially inserted in the right outer tube 312. An upper portion of the right inner tube 316 is fixed to the right bracket 317.

The right shock absorber 33 is preferably a so-called telescopic shock absorber, for example. When the right inner tube 316 moves relative to the right outer tube 312 in a direction that the right outer tube 312 extends, the right shock absorber 33 extends or contracts in that direction. This enables the right shock absorber 33 to buffer a displacement of the right front wheel 31 in the up-down direction of the vehicle body frame 21 in relation to the right inner tube 316.

The left shock absorber 35 includes a left outer tube 322 (one example of a lower portion of the left shock absorber). The left outer tube 322 supports the left front wheel 32. The left outer tube 322 extends in the up-down direction of the vehicle body frame 21. The left outer tube 322 includes a left support shaft 324 at a lower end portion thereof. The left front wheel 32 is supported by the left support shaft 324.

The left shock absorber 35 includes a left inner tube 326 (one example of an upper portion of the left shock absorber). The left inner tube 326 extends in the up-down direction of the vehicle body frame 21. The left inner tube 326 is disposed directly above the left outer tube 322 when the left inner tube 326 is partially inserted in the left outer tube 322. An upper portion of the left inner tube 326 is fixed to the left bracket 327.

The left shock absorber 35 is preferably a so-called telescopic shock absorber, for example. When the left inner tube 326 moves relative to the left outer tube 322 in a direction that the left outer tube 322 extends, the left shock absorber 35 extends or contracts in that direction. This enables the left shock absorber 35 to buffer a displacement of the left front wheel 32 in the up-down direction of the vehicle body frame 21 in relation to the left inner tube 326.

Figure 3:
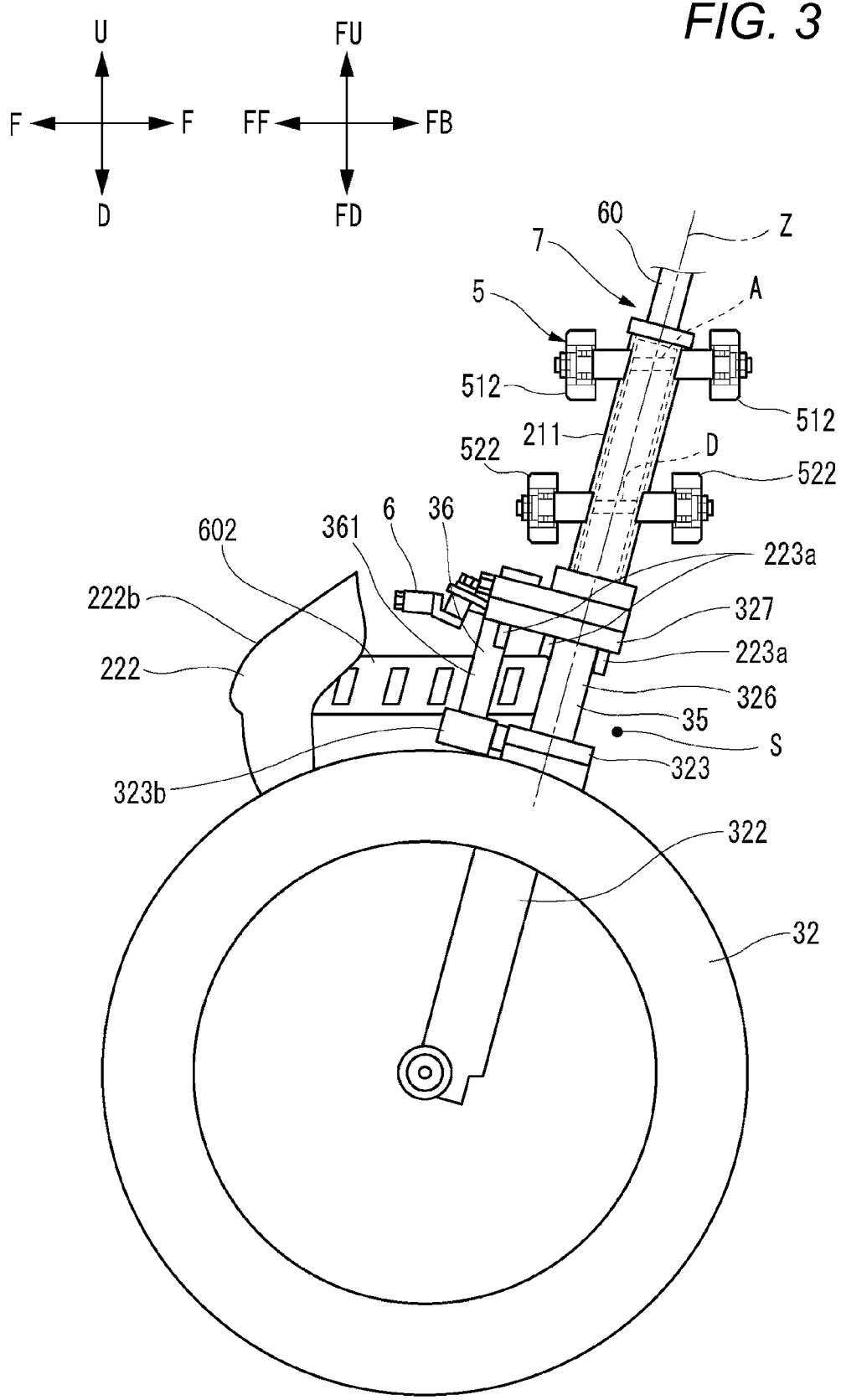
FIG. 3 is a left side view wherein a portion of the vehicle shown in FIG. 1 is seen from the left side.

FIG. 3 is a left side view wherein the front portion of the vehicle 1 is seen from the left side of the vehicle body frame 21. In FIG. 3, the vehicle body frame 21 is in the upright state. The following description referring to FIG. 3 will be based on the premise that the vehicle body frame 21 is in the upright state. FIG. 3 shows the front portion of the vehicle 1 when the front cover 221 and the pair of left and right front fenders 223 are removed.

The left shock absorber 35 includes a left turn prevention mechanism 36. The left turn prevention mechanism 36 includes a left turn prevention rod 361 (one example of an upper portion of the left shock absorber), a left guide 323, and the left bracket 327. The left guide 323 is fixed to an upper portion of the left outer tube 322. The left guide 323 includes a left guide tube 323*b* at a front portion thereof.

The left turn prevention rod 361 extends parallel or substantially parallel to the left inner tube 326. The left turn prevention rod 361 is fixed to a front portion of the left bracket 327. The left turn prevention rod 361 is disposed directly ahead of the left inner tube 326 when the left turn prevention rod 361 is partially inserted into the left guide tube 323*b*. This prevents the left turn prevention rod 361 from moving relative to the left inner tube 326. When the left inner tube 326 moves relative to the left outer tube 322 in a direction that the left outer tube 322 extends, the left turn prevention rod 361 also moves relative to the left guide tube 323*b*. On the other hand, the left outer tube 322 is prevented from turning relative to the left inner tube 326 about an axis that extends in a direction that the left shock absorber 35 extends or contracts.

As shown in FIG. 2, the right shock absorber 33 includes a right turn prevention mechanism 34. The right turn prevention mechanism 34 includes a right turn prevention rod 341 (one example of an upper portion of the right shock absorber), a right guide 313, and the right bracket 317. The right guide 313 is fixed to an upper portion of the right outer tube 312. The right guide 313 includes a right guide tube 313b at a front portion thereof.

The right turn prevention rod 341 extends parallel or substantially parallel to the right inner tube 316. The right turn prevention rod 341 is fixed to a front portion of the right bracket 317. The right turn prevention rod 341 is disposed directly ahead of the right inner tube 316 with a portion thereof inserted into the right guide tube 313b. This prevents the right turn prevention rod 341 from moving relative to the right inner tube 316. When the right inner tube 316 moves relative to the right outer tube 312 in a direction that the right outer tube 312 extends, the right turn prevention rod 341 also moves relative to the right guide tube 313b. On the other hand, the right outer tube 312 is prevented from turning relative to the right inner tube 316 about an axis that extends in a direction that the right shock absorber 33 extends or contracts.

As shown in FIG. 2, the steering mechanism 7 includes a steering force transmission mechanism 6. The steering force transmission mechanism 6 includes the handlebar 23 and a steering shaft 60. The handlebar 23 is attached to an upper portion of the steering shaft 60. A portion of the steering shaft 60 is turnably supported on the head pipe 211. A turning axis Z of the steering shaft 60 extends in the up-down direction of the vehicle body frame 21. As shown in FIG. 1, the upper portion of the steering shaft 60 is disposed behind a lower portion thereof. Consequently, as shown in FIG. 3, the turning axis Z of the steering shaft 60 is inclined in the front-rear direction of the vehicle body frame 21. The steering shaft 60 turns about the turning axis Z according to an operation of the handlebar 23 by the rider.

The steering force transmission mechanism 6 transmits a steering force generated in accordance with the operation of the handlebar 23 by the rider to the right bracket 317 and the left bracket 327. A specific configuration thereof will be described in detail below.

In the vehicle 1 according to the present preferred embodiment, the link mechanism 5 preferably uses a four parallel joint link system (also referred to as a parallelogram link).

As shown in FIG. 2, the link mechanism 5 is disposed below the handlebar 23. The link mechanism 5 is disposed above the right front wheel 31 and the left front wheel 32. The link mechanism 5 includes an upper cross member 51, a lower cross member 52, a right side member 53 and a left side member 54. The link mechanism 5 is free from the turning of the steering shaft 60 about the turning axis Z in association with the operation of the handlebar 23 and does not turn relative to the vehicle body frame 21 about the turning axis Z.

The upper cross member 51 includes a pair of plate-shaped members 512. The plate-shaped members 512 are disposed individually directly ahead of and directly behind the head pipe 211. Each of the plate-shaped members 512 extends in the left-right direction of the vehicle body frame 21.

A middle portion of the upper cross member 51 is supported on the head pipe 211 by a support portion A. The upper cross member 51 is able to turn relative to the head pipe 211 about a middle upper axis that passes through the support portion A and extends in the front-rear direction of the vehicle body frame 21.

A right end portion of the upper cross member 51 is supported on the right side member 53 by a support portion B. The upper support portion 51 is able to turn relative to the right side member 53 about a right upper axis that passes through the support portion B and extends in the front-rear direction of the vehicle body frame 21.

A left end portion of the upper cross member 51 is supported on the left side member 54 by a support portion C. The upper cross member 51 is able to turn relative to the left side member 54 about a left upper axis that passes through the support portion C and extends in the front-rear direction of the vehicle body frame 21.

The lower cross member 52 includes a pair of plate-shaped members 522. The plate-shaped members 522 are disposed individually directly ahead of and directly behind the head pipe 211. Each of the plate-shaped members 522 extends in the left-right direction of the vehicle body frame 21. The second cross member 52 is disposed below the first cross member 51. A lengthwise dimension of the lower cross member 52 in the left-right direction of the vehicle body frame 21 is the same as or similar to a lengthwise dimension of the upper cross member 51 in the left-right direction of the vehicle body frame 21. The lower cross member 52 extends parallel or substantially parallel to the upper cross member 51.

A middle portion of the lower cross member 52 is supported on the head pipe 211 by a support portion D. The lower cross member 52 is able to turn about a middle lower axis that passes through the support portion D and extends in the front-rear direction of the vehicle body frame 21.

A right end portion of the lower cross member 52 is supported on the right side member 53 by a support portion E. The lower cross member 52 is able to turn about a right lower axis that passes through the support portion E and extends in the front-rear direction of the vehicle body frame 21.

A left end portion of the lower cross member 52 is supported on the left side member 54 by a support portion F. The lower cross member 52 is able to turn about a left lower axis that passes through the support portion F and extends in the front-rear direction of the vehicle body frame 21.

The middle upper axis, the middle right axis, the middle left axis, the middle lower axis, the right lower axis, and the left lower axis extend parallel or substantially parallel to each other. The middle upper axis, the middle right axis, the middle left axis, the middle lower axis, the right lower axis, and the left lower axis are disposed above the right front wheel 31 and the left front wheel 32.

Figure 4:
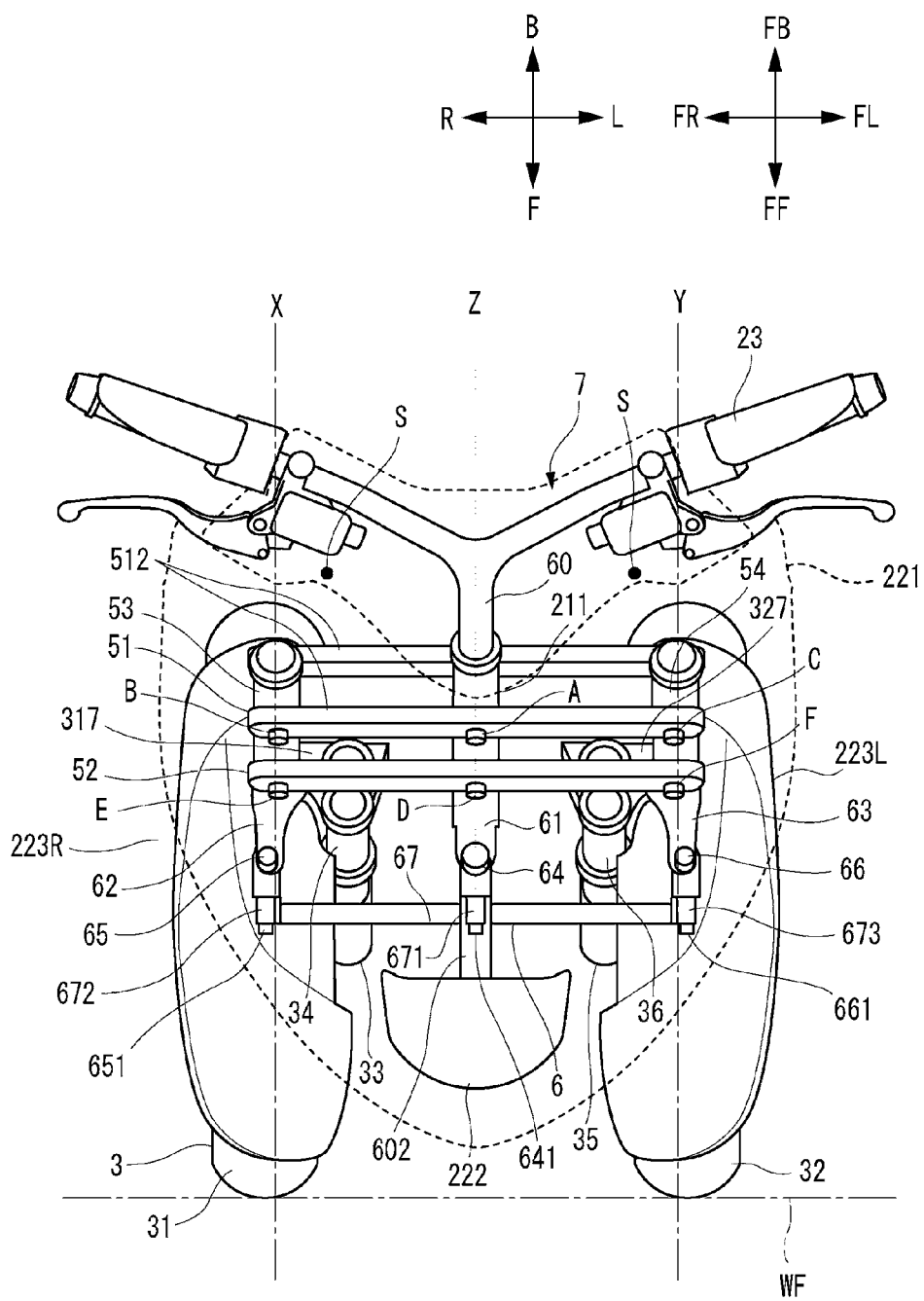
FIG. 4 is a plan view wherein a portion of the vehicle shown in FIG. 1 is seen from above.

FIG. 4 is a plan view wherein the front portion of the vehicle 1 is seen from above of the vehicle body frame 21. In FIG. 4, the vehicle body frame 21 is in the upright state. The following description referring to FIG. 4 will be based on the premise that the vehicle body frame 21 is in the upright state. FIG. 4 shows a state seen through the front cover 221 which is indicated by dashed lines.

As shown in FIGS. 2 and 4, the right side member 53 is disposed directly to the right of the head pipe 211. The right side member 53 is disposed above the right front wheel 31. The right side member 53 extends in a direction that the head pipe 211 extends. The right side member 53 extends in a direction that the turning axis Z of the steering shaft 60 extends. An upper portion of the right side member 53 is disposed behind a lower portion thereof.

The lower portion of the right side member 53 is connected to the right bracket 317. The right bracket 317 is able to turn relative to the right side member 53 about a right center axis X. The right center axis X extends in the direction that the right side member 53 extends. As shown in FIG. 2, the right center axis X extends parallel or substantially parallel to the turning axis Z of the steering shaft 60 in the up-down direction of the vehicle body frame 21. As shown in FIG. 4, the right center axis X extends parallel or substantially parallel to the turning axis Z of the steering shaft 60 in the front-rear direction of the vehicle body frame 21.

As shown in FIGS. 2 and 4, the left side member 54 is disposed directly to the right of the head pipe 211. The left side member 54 is disposed above the left front wheel 32. The left side member 54 extends in the direction that the head pipe 211 extends. The left side member 54 extends in the direction that the turning axis Z of the steering shaft 60 extends. An upper portion of the left side member 54 is disposed behind a lower portion thereof.

The lower portion of the left side member 54 is connected to the left bracket 327. The left bracket 327 is able to turn relative to the left side member 54 about a left center axis Y. The left center axis Y extends in the direction that the right side member 53 extends. As shown in FIG. 2, the left center axis Y extends parallel or substantially parallel to the turning axis Z of the steering shaft 60 in the up-down direction of the vehicle body frame 21. As shown in FIG. 4, the left center axis Y extends parallel or substantially parallel to the turning axis Z of the steering shaft 60 in the front-rear direction of the vehicle body frame 21.

Thus, as has been described above, the upper cross member 51, the lower cross member 52, the right side member 53, and the left side member 54 are supported on the vehicle body frame 21 so that the upper cross member 51 and the lower cross member 52 maintain postures that are parallel or substantially parallel to each other and the right side member 53 and the left side member 54 maintain postures that are parallel or substantially parallel to each other.

As shown in FIG. 2, the steering force transmission mechanism 6 includes a middle transmission plate 61, a right transmission plate 62, a left transmission plate 63, a middle joint 64, a right joint 65, a left joint 66, and a tie rod 67, in addition to the handlebar 23 and the steering shaft 60.

The middle transmission plate 61 is connected to the lower portion of the steering shaft 60. The middle transmission plate 61 cannot turn relative to the steering shaft 60. The middle transmission plate 61 is able to turn relative to the head pipe 211 about the turning axis Z of the steering shaft 60. A front portion of the middle transmission plate 61 is tapered in the left-right direction of the vehicle body frame 21 than a rear portion thereof.

The right transmission plate 62 is disposed directly to the right of the middle transmission plate 61. The right transmission plate 62 is connected to a lower portion of the right bracket 317. The right transmission plate 62 cannot turn relative to the right bracket 317. The right transmission plate 62 is able to turn relative to the right side member 53 about the right center axis X. A front portion of the right transmission plate 62 is tapered in the left-right direction of the vehicle body frame 21 than a rear portion thereof.

The left transmission plate 63 is disposed directly to the left of the middle transmission plate 61. The left transmission plate 63 is connected to a lower portion of the left bracket 327. The left transmission plate 63 cannot turn relative to the left bracket 327. The left transmit 63 is able to turn relative to the left side member 54 about the left center axis Y. A front portion of the left transmission plate 63 is tapered in the left-right direction of the vehicle body frame 21 than a rear portion thereof.

As shown in FIG. 4, the middle joint 64 is disposed at the front portion of the middle transmission plate 61. The right joint 65 is disposed directly to the right of the right transmission plate 62. The right joint 65 is disposed at the right side of the middle joint 64. The left joint 66 is disposed at the front portion of the left transmission plate 63. The left joint 66 is disposed directly to the left of the middle joint 64.

The tie rod 67 extends in the left-right direction of the vehicle body frame 21. The tie rod 67 includes a middle front rod 641, a right front rod 651, and a left front rod 661.

The middle front rod 641 extends in the left-right direction of the vehicle body frame 21. The middle front rod 641 is supported on the middle transmission plate 61 via the middle joint 64. The middle front rod 641 is able to turn relative to the middle transmission plate 61. A turning axis of the middle front rod 641 relative to the middle transmission plate 61 extends parallel or substantially parallel to the turning axis Z of the steering shaft 60.

The right front rod 651 is disposed directly to the right of the middle front rod 641. The right front rod 651 extends in the left-right direction of the vehicle body frame 21. The right front rod 651 extends parallel or substantially parallel to the middle front rod 641. The right front rod 651 is supported on the right transmission plate 62 via the right joint 65. The right front rod 651 is able to turn relative to the right transmission plate 62. A turning axis of the right front rod 651 relative to the right transmission plate 62 extends parallel or substantially parallel to the right center axis X.

The left front rod 661 is disposed directly to the left of the middle front rod 641. The left front rod 661 extends in the left-right direction of the vehicle body frame 21. The left front rod 661 extends parallel or substantially parallel to the middle front rod 641. The left front rod 661 is supported on the left transmission plate 63 via the left joint 66. The left front rod 661 is able to turn relative to the left transmission plate 63. A turning axis of the left front rod 661 relative to the left transmission plate 63 extends parallel or substantially parallel to the left center axis Y.

The tie rod 67 further includes a middle ring 671, a right ring 672, and a left ring 673.

The middle ring 671 is connected to the middle front rod 641. The middle ring 671 is able to turn relatively about the middle front rod 641 that extends in the front-rear direction of the vehicle body frame 21.

The right ring 672 is disposed directly to the right of the middle ring 671. The right ring 672 is connected to the right front rod 651. The right ring 672 is able to turn relatively about the right front rod 651 that extends in the front-rear direction of the vehicle body frame 21.

The left ring 673 is disposed directly to the left of the middle ring 671. The left ring 673 is connected to the left front rod 661. The left ring 673 is able to turn relatively about the left front rod 661 that extends in the front-rear direction of the vehicle body frame 21.

Thus, as has been described above, the right transmission plate 62 and the left transmission plate 63 are respectively connected to the middle transmission plate 61 via the tie rod 67.

Figure 7:
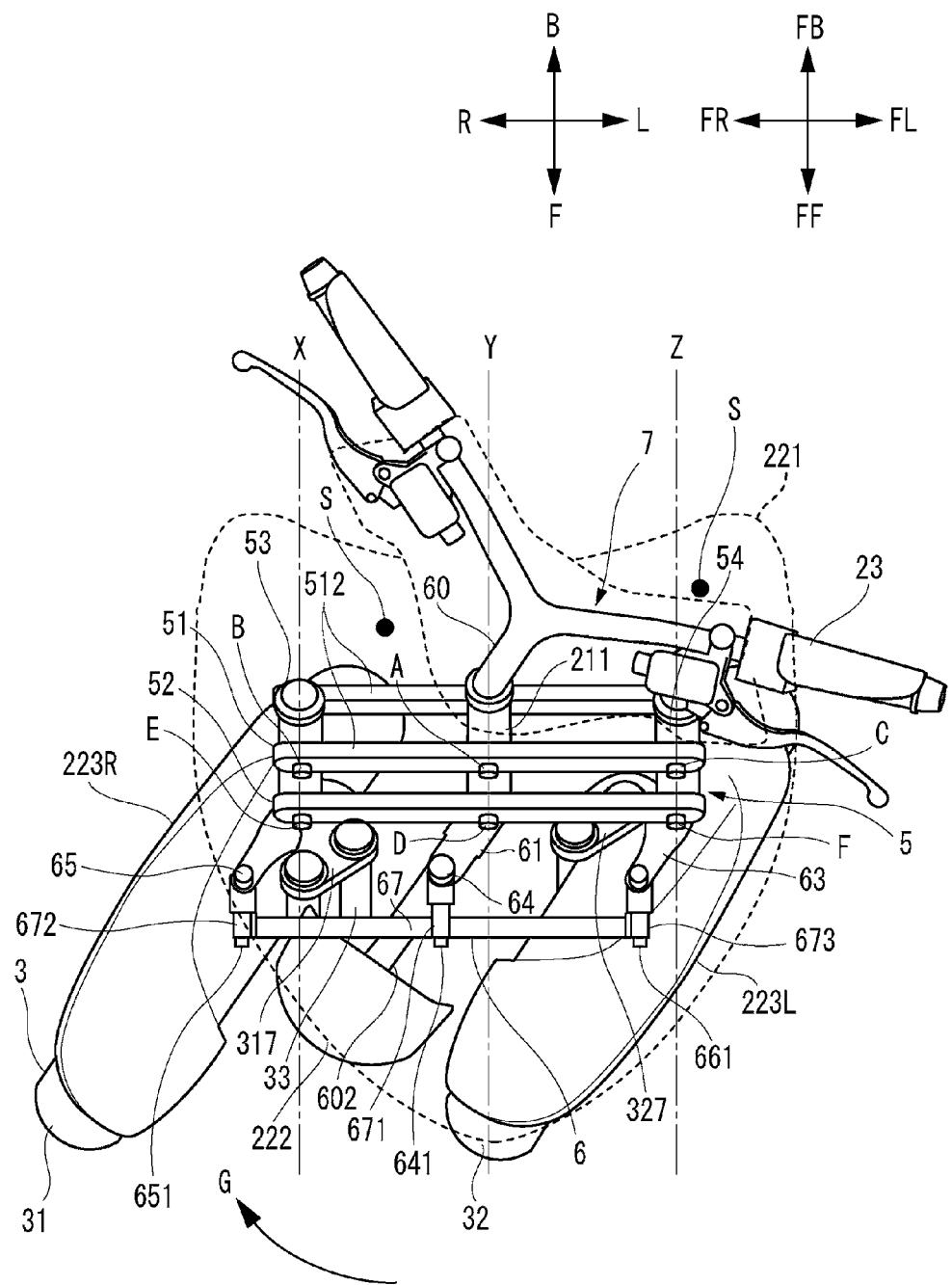
FIG. 7 is a plan view wherein a portion of the vehicle shown in FIG. 1 is seen from above when the vehicle is steered to the right.

Next, referring to FIGS. 4 and 7, a steering operation of the vehicle 1 will be described. FIG. 7 is a plan view wherein the front portion of the vehicle 1 is seen from above the vehicle body frame 21 and showing a state that the right front wheel 31 and the left front wheel 32 are steered rightward. FIG. 7 shows a state seen through the front cover 221 which is indicated by dashed lines.

When the rider operates the handlebar 23, the steering shaft 60 is turned about the turning axis Z relative to the head pipe 211. In a case where the rightward steering as shown in FIG. 7, the steering shaft 60 turns in a direction indicated by an arrow G. The middle transmission plate 61 turns about the turning axis z in the direction of the arrow G relative to the head pipe 211 as the steering shaft 60 turns.

The middle front rod 641 of the tie rod 67 turns in an opposite direction to the direction indicated by the arrow G about the middle joint 64 relative to the middle transmission plate 61 as the middle transmission plate 61 turns in the direction indicated by the arrow G. This causes the tie rod 67 to move rightward and rearward while maintaining the posture of the tie rod 67.

As the tie rod 67 moves rightward and rearward, the right front rod 651 and the left front rod 661 of the tie rod 67 turn in the opposite direction to the direction indicated by the arrow G about the right joint 65 and the left joint 66, respectively. This causes the right transmission plate 62 and the left transmission plate 63 to turn in the direction indicated by the arrow G while the tie rod 67 is maintaining its posture.

When the right transmission plate 62 turns in the direction indicated by the arrow G, the right bracket 317 that is prevented from turning relative to the right transmission plate 62 turns about the right center axis X in the direction indicated by the arrow G relative to the right side member 53.

When the left transmission plate 63 is turned in the direction indicated by the arrow G, the left bracket 327 that is prevented from turning relative to the left transmission plate 63 is turned about the left center axis Y in the direction indicated by the arrow G relative to the left side member 54.

When the right bracket 317 turns in the direction indicated by the arrow G, the right shock absorber 33 that is connected to the right bracket 317 via the right inner tube 316 turns in the direction indicated by the arrow G about the right center axis X relative to the right side member 53. When the right shock absorber 33 is turned in the direction indicated by the arrow G, the right front wheel 31 that is supported on the right shock absorber 33 via the right support shaft 314 is turned in the direction indicated by the arrow G about the right center axis X relative to the right side member 53.

When the left bracket 327 turns in the direction indicated by the arrow G, the left shock absorber 35 that is connected to the left bracket 327 via the left inner tube 326 turns in the direction indicated by the arrow G about the left center axis Y relative to the left side member 54. When the left shock absorber 35 is turned in the direction indicated by the arrow G, the left front wheel 32 that is supported on the left shock absorber 35 via the left support shaft 324 is turned in the direction indicated by the arrow G about the left center axis Y relative to the left side member 54.

Thus, as has been described above, the steering force transmission mechanism 6 transmits a steering force to the right front wheel 31 and the left front wheel 32 in accordance with the operation of the handlebar 23 by the rider. The right front wheel 31 and the left front wheel 32 turn in a direction that corresponds to a direction that the handlebar 23 is operated by the rider about the right center axis X and the left center axis Y.

Figure 5:
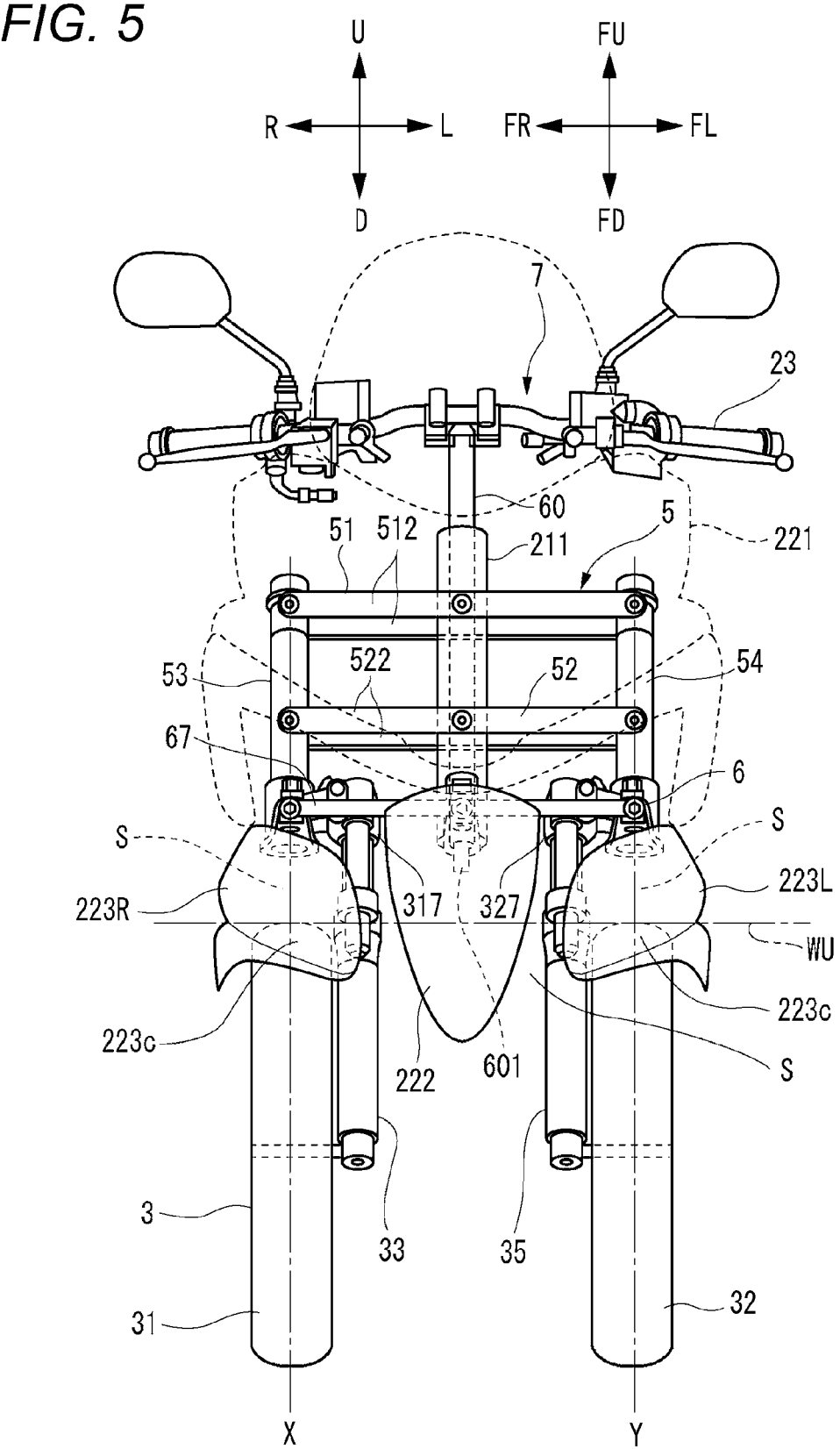
FIG. 5 is a front view wherein a portion of the vehicle shown in FIG. 1 is seen from the front.
Figure 8:
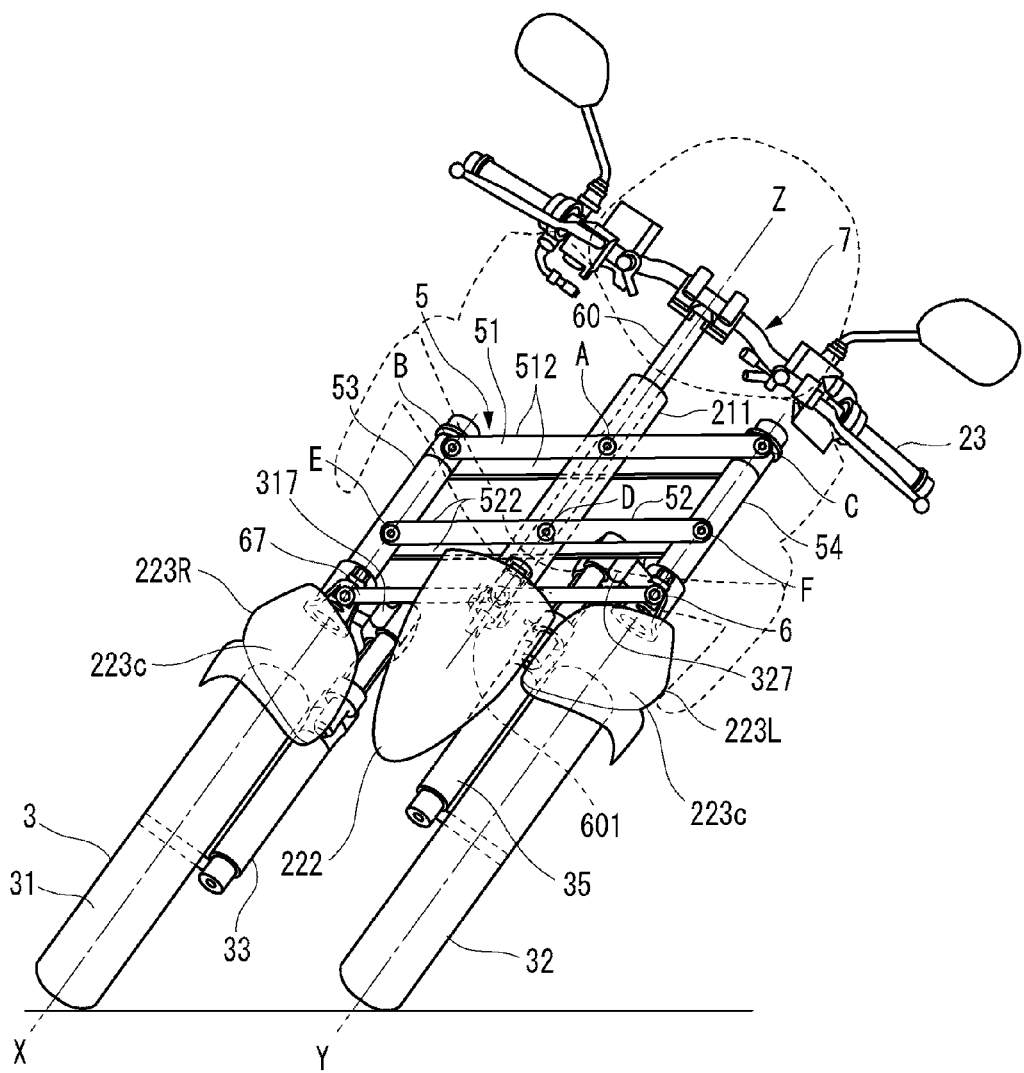
FIG. 8 is a front view wherein a portion of the vehicle shown in FIG. 1 is seen from the front when the vehicle is caused to lean leftward.

Next, referring to FIGS. 5 and 8, a leaning operation of the vehicle 1 will be described. FIG. 5 is a front view wherein the front portion of the vehicle 1 is seen from the front of the vehicle body frame 21. In FIG. 5, the vehicle body frame 21 is in the upright state. The following description referring to FIG. 5 will be based on the premise that the vehicle body frame 21 is in the upright state. FIG. 5 shows a state seen through the front cover 221 that is indicated by dashed lines. FIG. 8 is a front view wherein the front portion of the vehicle 1 is seen from the front of the vehicle body frame 21 when the vehicle body frame 21 is caused to lean leftward. FIG. 8 shows a state seen through the front cover 221 that is indicated by dashed lines.

As shown in FIG. 5, when the vehicle body frame 21 is in the upright state, the link mechanism 5 has a rectangular or substantially rectangular shape when the vehicle 1 is seen from the front of the vehicle body frame 21. As shown in FIG. 8, when the vehicle body frame 21 is in the leaned state, the link mechanism 5 has the shape of a parallelogram when the vehicle 1 is seen from the front of the vehicle body frame 21. The deformation of the link mechanism 5 is interlocked with the leftward or rightward leaning of the vehicle body frame 21. When the link mechanism 5 is described as operating, this indicates that the upper cross member 51, the lower cross member 52, the right side member 53, and the left side member 54 of the link mechanism 5 turn relative to each other about the turning axes that pass through the corresponding support portions A to F to deform the link mechanism 5.

For example, as shown in FIG. 8, when the rider causes the vehicle 1 to lean leftward, the head pipe 211 leans leftward in relation to the vertical direction. When the head pipe 211 leans, the upper cross member 51 turns rightward relative to the head pipe 211 about the middle upper axis that passes through the support portion A. Similarly, the lower cross member 52 turns rightward relative to the head pipe 211 about the middle lower axis that passes through the support portion D. This causes the upper cross member 51 to move leftward relative to the lower cross member 52.

As the upper cross member 51 moves leftward, the upper cross member 51 turns rightward relative to the right side member 53 and the left side member 54 about the right upper axis that passes through the support portion B and the left upper axis that passes through the support portion C. Similarly, the lower cross member 52 turns rightward relative to the right side member 53 and the left side member 54 about the right lower axis that passes through the support portion E and the left lower axis that passes through the support portion F. This causes the right side member 53 and the left side member 54 to lean leftward in relation to the vertical direction while maintaining their postures that are parallel to the head pipe 211.

Here, the lower cross member 52 moves leftward relative to the tie rod 67. As the lower cross member 52 moves leftward, the middle ring 671, the right ring 672 and the left ring 673 of the tie rod 67 turn rightward about the middle front rod 641, the right front rod 651, and the left front rod 661, respectively. This enables the tie rod 67 to keep the posture parallel or substantially parallel to the upper cross member 51 and the lower cross member 52.

As the right side member 53 leans leftward, the right bracket 317 that is connected to the right side member 53 leans leftward. As the right bracket 317 leans leftward, the right shock absorber 33 that is connected to the right bracket 317 leans leftward. As the right shock absorber 33 leans leftward, the right front wheel 31 that is supported on the right shock absorber 33 leans leftward while maintaining its posture that is parallel or substantially parallel to the head pipe 211.

As the left side member 54 leans leftward, the left bracket 327 that is connected to the left side member 54 leans leftward. As the left bracket 327 leans leftward, the left shock absorber 35 that is connected to the left bracket 327 leans leftward. As the left shock absorber 35 leans leftward, the left front wheel 32 that is supported on the left shock absorber 35 leans leftward while maintaining its posture that is parallel or substantially parallel to the head pipe 211.

The description of the leaning operations of the right front wheel 31 and the left front wheel 32 are based on the vertical direction. However, when the vehicle 1 is caused to lean (when the link mechanism 5 operates), the up-down direction of the vehicle body frame 21 does not coincide with the vertical direction. When a description is made based on the up-down direction of the vehicle body frame 21, and the link mechanism 5 is in operation, the relative positions of the right front wheel 31 and the left front wheel 32 to the vehicle body frame 21 change. In other words, the link mechanism 5 changes the positions of the right front wheel 31 and the left front wheel 32 relative to the vehicle body frame 21 in the up-down direction of the vehicle body frame 21 to cause the vehicle body frame 21 to lean in relation to the vertical direction.

As shown in FIG. 4, in such a state that the vehicle 1 is not turned or steered at all and that the vehicle body 21 is in the upright state, respective front ends WF of the right front wheel 31 and the left front wheel 32 coincide with each other. Although not shown in the figure, respective rear ends WB of the right front wheel 31 and the left front wheel 32 also coincide with each other. In addition, as shown in FIG. 5, in such a state that the vehicle 1 is not turned or steered at all and that the vehicle body 21 is in the upright state, respective upper ends WU of the right front wheel 31 and the left front wheel 32 coincide with each other.

Figure 6:
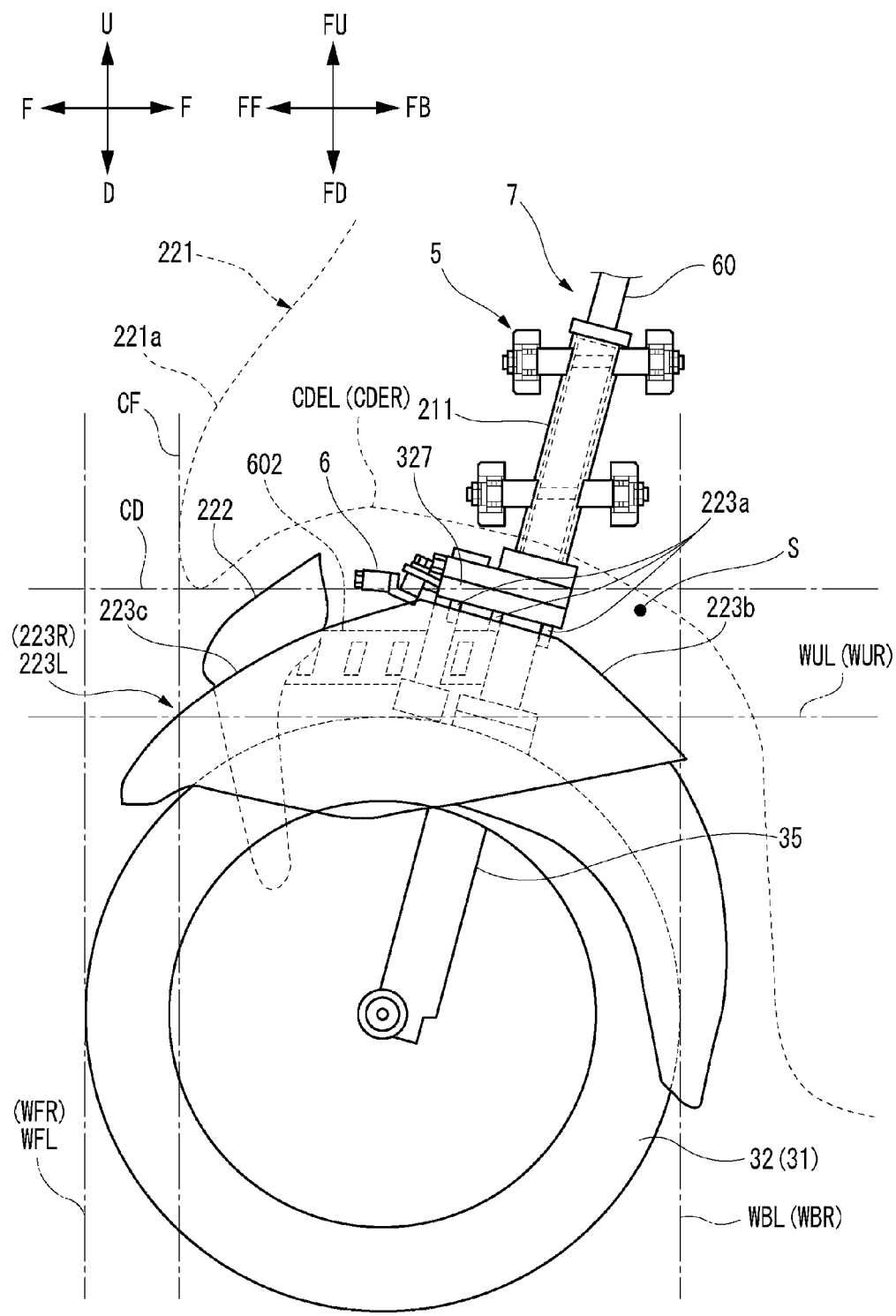
FIG. 6 is a left side view wherein a portion of the vehicle shown in FIG. 1 is seen from the left side.

As described with reference to FIG. 1, the vehicle body cover 22 includes the front cover 221, the front spoiler 222, and the front fenders 223. Referring to FIG. 6, the positions and shapes of those constituent elements will be described. FIG. 6 is a side view wherein the front portion of the vehicle 1 is seen from a left side of the vehicle body frame 21. In FIG. 6, the vehicle body frame 21 is in the upright state. The following description referring to FIG. 6 will be based on the premise that the vehicle body frame 21 is in the upright state. FIG. 6 shows a state seen through the front cover 221 that is indicated by dashed lines.

The front cover 221 (one example of a link cover portion) covers at least a portion of the link mechanism 5. The front cover 221 is configured so as not to be displaced relative to the vehicle body frame 21. The front cover 221 includes a front portion 221a. The front portion 221a is disposed ahead of the respective rear ends WB of the right front wheel 31 and the left front wheel 32 in the front-rear direction of the vehicle body frame 21. A front end CF of the front portion 221a is disposed behind the respective front ends WF of the right front wheel 31 and the left front wheel 32 in the front-rear direction of the vehicle body frame 21 when the vehicle body frame 21 is in the upright state.

The front spoiler 222 is preferably made of synthetic resin or the like. The front spoiler 222 is connected to the steering shaft 60 via a stay 602. As shown in FIG. 5, a lower end portion of the steering shaft 60 projects downward than a lower end portion of the head pipe 211 to define a spoiler mounting portion 601.

The front spoiler 222 is configured so as to be displaced in relation to the vehicle body frame 21 in accordance with the operation of the steering mechanism 7. As shown in FIG. 7, when the rider operates the handlebar 23, the steering shaft 60 turns about the turning axis Z relative to the head pipe 211. This causes the front spoiler 222 that is connected to the steering shaft 60 via the spoiler mounting portion 601 and the stay 602 to turn about the turning axis Z relative to the head pipe 211. More specifically, the front spoiler 222 is displaced in the left-right direction of the vehicle body frame 21 in accordance with the operation of the steering mechanism 7.

As shown in FIG. 8, when the rider causes the vehicle 1 to lean leftward, the head pipe 211 leans leftward in relation to the vertical direction. When the head pipe 211 leans leftward, the steering shaft 60 also leans leftward. When the steering shaft 60 leans leftward, the front spoiler 222 that is connected to the steering shaft 60 via the spoiler mounting portion 601 and the stay 602 leans leftward in relation to the vertical direction.

The front fenders 223 include a right front fender 223R and a left front fender 223L. The right front fender 223R and the left front fender 223L are preferably made of synthetic resin or the like. As shown in FIG. 6, the left front fender 223L includes a rear surface 223b and a front surface 223c which are inclined. Although not shown, the right front fender 223R preferably also has a similar configuration.

The left front fender 223L is supported on the left bracket 327. A plurality of stud bolts 223a are provided on the left bracket 327. A plurality of hole portions through which the stud bolts 223a are respectively inserted are provided in the left front fender 223L. The left front fender 223L is fixed to the left bracket 327 by inserting the plurality of stud bolts 223a into the plurality of corresponding hole portions. The left front fender 223L cannot be displaced relative to the left bracket 327.

The right front fender 223R is supported on the right bracket 317. Although not shown, the right front fender 223R is fixed to the right bracket 317 by a similar configuration to that of the left front fender 223L. The right front fender 223R cannot be displaced relative to the right bracket 317.

Consequently, the right front fender 223R and the left front fender 223L are configured so as to be displaced relative to the vehicle body frame 21 in accordance with the operation of the steering mechanism 7. As shown in FIG. 7, when the rider operates the handlebar 23, via the steering force transmission mechanism 6, the right bracket 317 and the left bracket 327 are turned relative to the right side member 53 and the left side member 54 about the right center axis X and the left center axis Y, respectively. This causes the right front fender 223R and the left front fender 223L that are connected to the right bracket 317 and the left bracket 327 via the stud bolts 223a to turn about the right center axis X and the left center axis Y relative to the right side member 53 and the left side member 54. More specifically, the right front fender 223R and the left front fender 223L are displaced in the left-right direction of the vehicle body frame 21 in accordance with the operation of the steering mechanism 7.

As shown in FIG. 8, when the rider causes the vehicle 1 to lean leftward, the link mechanism 5 operates. The positions of the right bracket 317 and the left bracket 327 relative to the vehicle body frame 21 are changed in the up-down direction of the vehicle body frame 21 in accordance with the operation of the link mechanism 5. Consequently, the right front fender 223R and the left front fender 223L that are fixed to the right bracket 317 and the left bracket 327, respectively, change their relative positions to the vehicle body frame 21 in the up-down direction of the vehicle body frame 21. More specifically, the right front fender 223R and the left front fender 223L are configured so as to be displaced relative to the vehicle body frame 21 in accordance with the operation of the link mechanism 5.

Thus, as has been described above, the vehicle 1 according to the present preferred embodiment includes the vehicle body frame 21. The handlebar 23 is able to turn relative to the vehicle body frame 21. At least a portion of the vehicle body cover 22 covers the vehicle body frame 21. The right front wheel 31 and the left front wheel 32 are arranged side by side in the left-right direction of the vehicle body frame 21. The steering mechanism 7 transmits a turning motion of the handlebar 23 to the right front wheel 31 and the left front wheel 32. The link mechanism 5 is disposed above the right front wheel 31 and the left front wheel 32 and changes the positions of the right front wheel 31 and the left front wheel 32 relative to the vehicle body frame 21 so as to cause the vehicle body frame 21 to lean in relation to the vertical direction. The power unit 25 is supported on the vehicle body frame 21. The vehicle body cover 22 includes the front cover 221 (one example of the link cover portion), the right front fender 223R (one example of a right protecting portion) and the left front fender 223L (one example of a left protecting portion).

Figure 17:
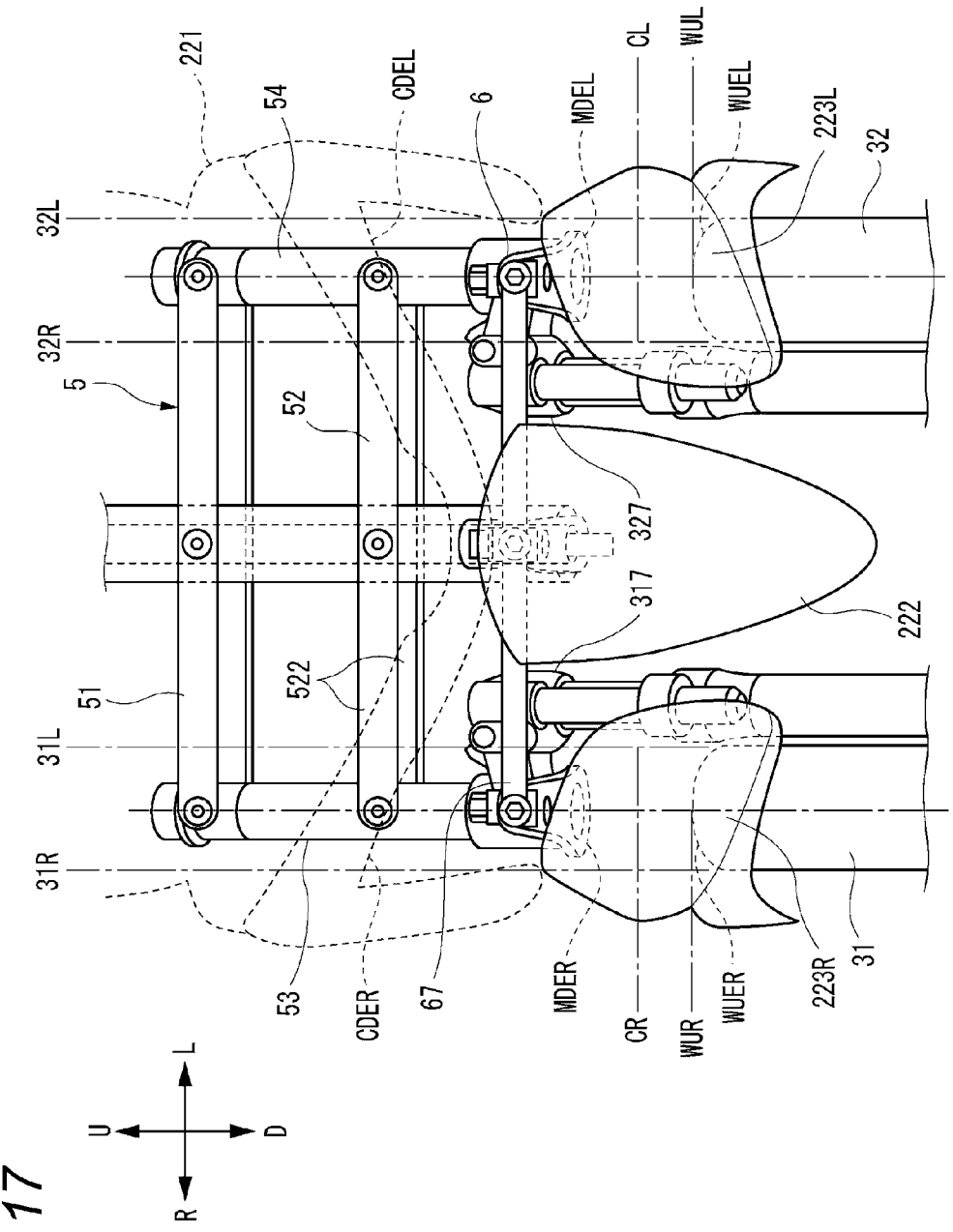
FIG. 17 is a view illustrating the right protecting portion and the left protecting portion provided on the vehicle shown in FIG. 1.

In the present preferred embodiment, as shown in FIG. 17, as seen from the front of the vehicle 1 in the front-rear direction of the vehicle body frame 21 when the vehicle body frame 21 is in the upright state, at least a portion of the right front fender 223R is disposed above a center CR in the up-down direction of the vehicle body frame 21 between the upper end WUR of the right front wheel 31 and a right lower edge MDER of the link mechanism 5 or the steering mechanism 7 that is directly above the right front wheel 31, and is disposed below a right lower edge CEDR of the front portion 221a of the front cover 221.

Here, the "right lower edge CDER of the front portion 221a of the front cover 221" denotes a contour portion of the front portion 221a shown in FIG. 6 that extends from a portion intersecting an imaginary line denoting the front end CF to a portion intersecting an imaginary line denoting a rear end WBR of the right front wheel 31 by way of a lower end CD.

Here, the "upper edge WUER of the right front wheel 31" denotes a contour portion that extends from a portion intersecting an imaginary line denoting a right end 31R of the right front wheel 31 to a portion intersecting an imaginary line denoting a left end 31L of the right wheel 31. Both imaginary lines shown in FIG. 17 extend in the up-down direction of the vehicle body frame 21.

Here, the "lower edge MEDR of the link mechanism 5 or the steering mechanism 7 that is directly above the right front wheel 31" denotes a contour portion of the link mechanism 5 or the steering mechanism 7 that appears between the imaginary line denoting the right end 31R of the right front wheel 31 and the left end 31L of the right front wheel 31 in FIG. 17, and that faces the upper edge WUER of the right front wheel 31. In the example shown in FIG. 17, portion of the right transmission plate 62 (see FIG. 2) defines the lower edge MDER. Any portion that is included in the link mechanism 5 or the steering mechanism 7 and that is disposed in the related position defines the lower edge MDER.

In addition, as seen from the front of the vehicle 1 in the front-rear direction of the vehicle body frame 21 when the vehicle body frame 21 is in the upright state, at least a portion of the left front fender 223L is disposed above a center CL in the up-down direction of the vehicle body frame 21 between the upper end WUL of the left front wheel 32 and a left lower edge MDEL of the link mechanism 5 or the steering mechanism 7 that is directly above the left front wheel 32, and is disposed below a left lower edge CEDL of the front portion 221a of the front cover 221.

Here, the "left lower edge CDEL of the front portion 221a of the front cover 221" denotes a contour portion of the front portion 221a shown in FIG. 6 that extends from a portion intersecting an imaginary line denoting the front end CF to a portion intersecting an imaginary line denoting a rear end WBL of the left front wheel 32 by way of a lower end CD.

Here, the "upper edge WUEL of the left front wheel 32" denotes a contour portion that extends from a portion intersecting an imaginary line denoting a right end 32R of the left front wheel 32 to a portion intersecting an imaginary line denoting a left end 32L of the left wheel 32. Both imaginary lines shown in FIG. 17 extend in the up-down direction of the vehicle body frame 21.

Here, the "lower edge MEDL of the link mechanism 5 or the steering mechanism 7 that is directly above the left front wheel 32" denotes a contour portion of the link mechanism 5 or the steering mechanism 7 that appears between the imaginary line denoting the right end 32R of the left front wheel 32 and the left end 32L of the left front wheel 32 in FIG. 17, and that faces the upper edge WUEL of the left front wheel 32. In the example shown in FIG. 17, portion of the left transmission plate 63 (see FIG. 2) defines the lower edge MDEL. Any portion that is included in the link mechanism 5 or the steering mechanism 7 and that is disposed in the related position defines the lower edge MDEL.

As shown in FIG. 5, as seen from the front in the front-rear direction of the vehicle body frame 21, an area directly above the right front wheel 31 and the left front wheel 32 and behind the right front wheel 31 and the left front wheel 32 is referred to as a behind-front-wheels area S. In the present preferred embodiment, as seen from the front in the front-rear direction of the vehicle body frame 21, each of a right upper portion and a left upper portion of the leg shield 225 corresponds to the behind-front-wheels area S. When no leg shield 225 is provided, among the vehicle elements that are mounted on the down frame 212 or the periphery thereof, what is corresponding to the behind-front-wheels area S is each of the portions directly above the right front wheel 31 and the left front wheel 32 as seen from the front in the front-rear direction of the vehicle body frame 21 while behind the right front wheel 31 and the left front wheel 32. The right front fender 223R and the left front fender 223L prevent incoming objects from entering the behind-front-wheels area S.

Figure 14:
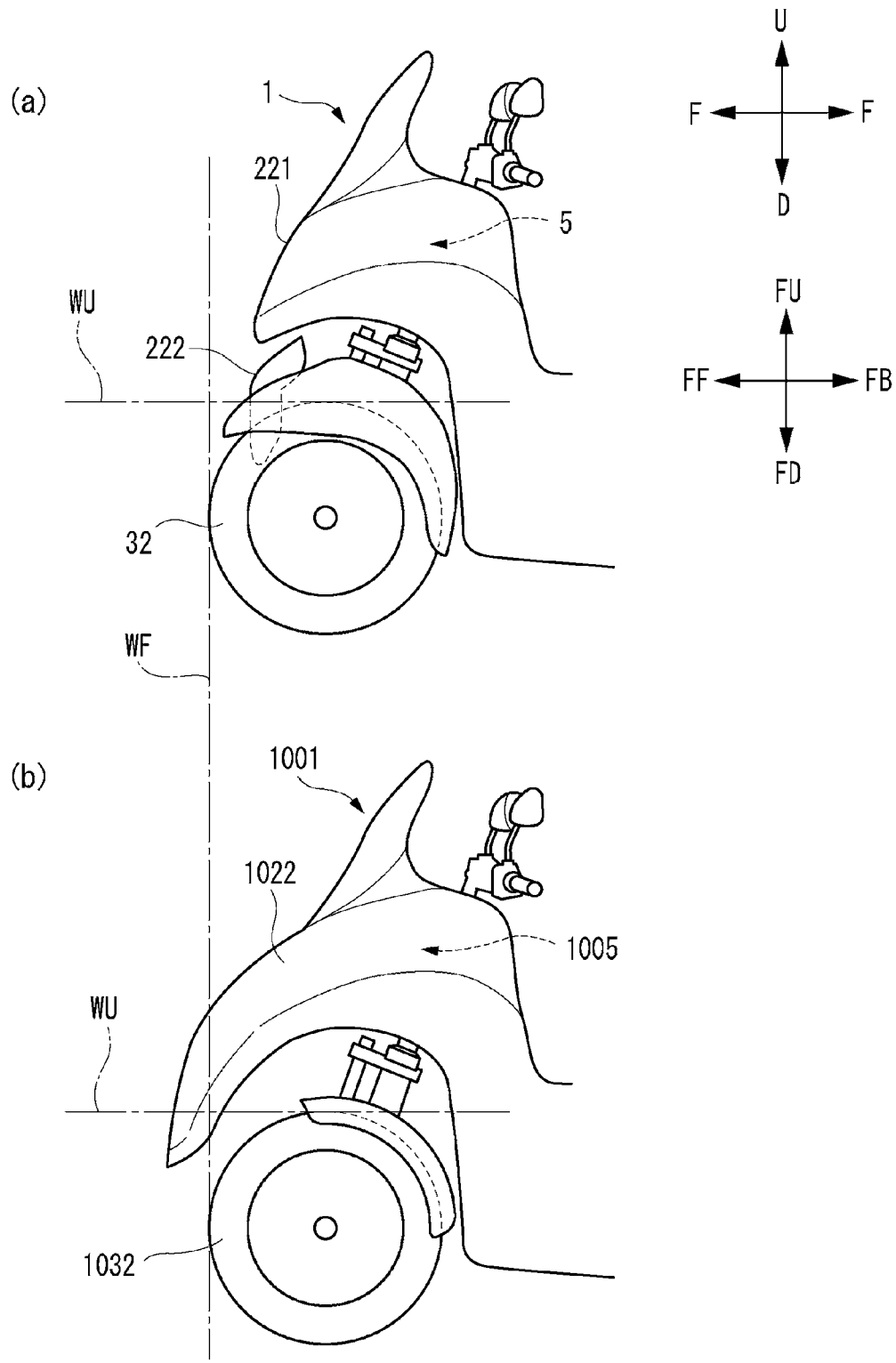
FIG. 14 is a view illustrating the effects of a right protecting portion and a left protecting portion provided on the vehicle shown in FIG. 1.
Figure 15:
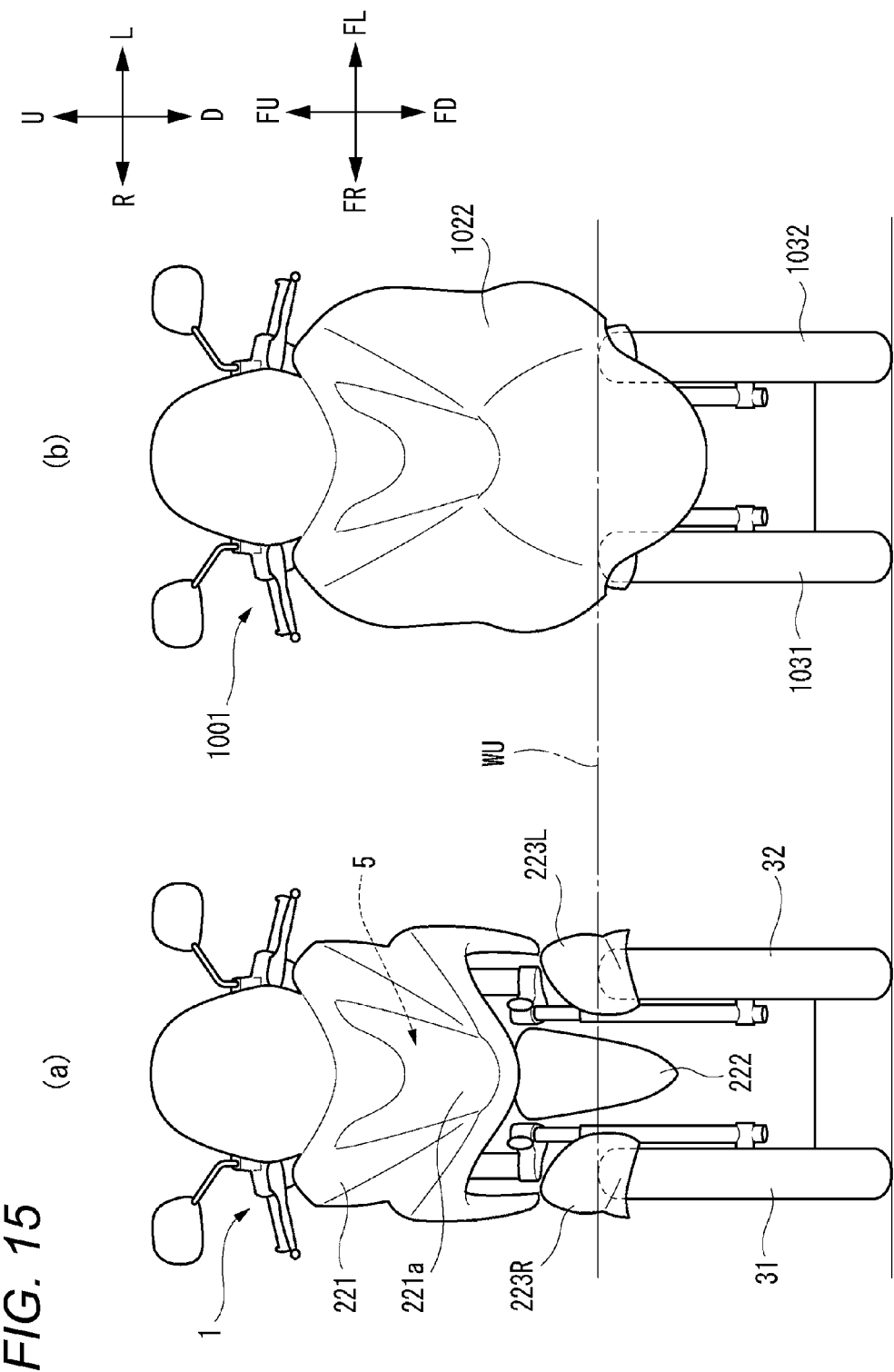
FIG. 15 is a view illustrating the effects of the right protecting portion and the left protecting portion provided on the vehicle shown in FIG. 1.
Figure 16:
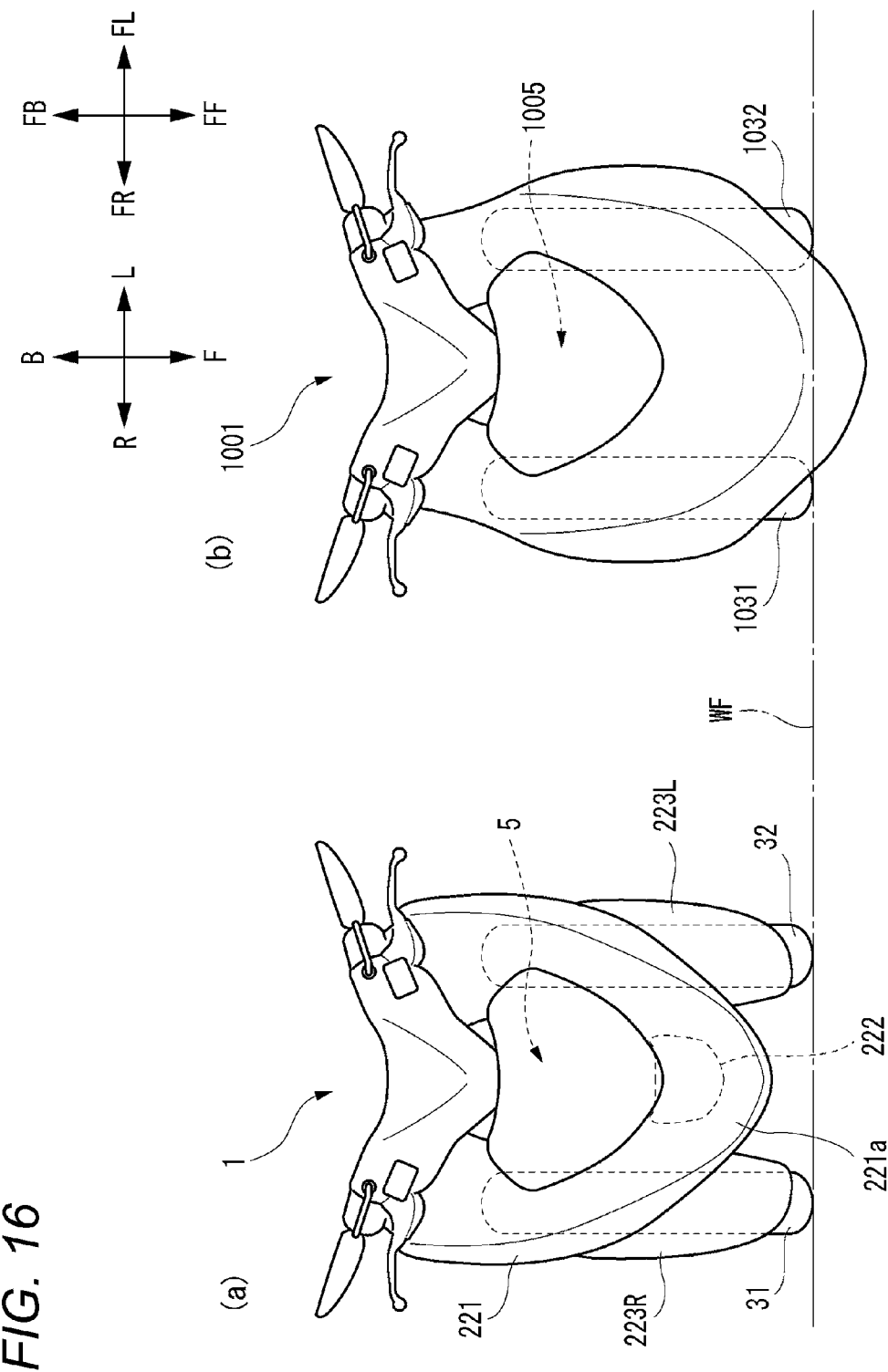
FIG. 16 is a view illustrating the effects of the right protecting portion and the left protecting portion provided on the vehicle shown in FIG. 1.

Referring to schematic drawings of FIGS. 14 to 16, 20A, and 20B, there will be described the functions and advantageous effects of the right front fender 223R and the left front fender 223L that are configured as described above. Portion (a) in FIG. 14 is a side view wherein the front portion of the vehicle 1 according to the present preferred embodiment is seen from the side of the vehicle body frame 21. Portion (b) in FIG. 14 is a side view wherein a front portion of a vehicle 1001 according to a comparison example is seen from the same direction. Portion (a) in FIG. 15 is a front view wherein the front portion of the vehicle 1 according to the present preferred embodiment is seen from the front of the vehicle body frame 21. Portion (b) in FIG. 15 is a front view wherein the front portion of the vehicle 1001 according to the comparison example is seen from the same direction. Portion (a) in FIG. 16 is a plan view wherein the front portion of the vehicle 1 according to the present preferred embodiment is seen from above of the vehicle body frame 21. Portion (b) in FIG. 16 is a plan view wherein the front portion of the vehicle 1001 according to the comparison example is seen from the same direction. In any one of those drawings, the vehicle body frame is in the upright state.

In the vehicle including the leanable vehicle body frame and the link mechanism, the right front wheel and the left front wheel each have a wide movable range. This is because the right front wheel and the left front wheel are turned when steered, are displaced in the up-down direction of the vehicle body frame as the right shock absorber and the left shock absorber extend or contract, and are displaced in the up-down direction of the vehicle body frame as the link mechanism operates. A vehicle body cover, which is configured so as not to be displaced relative to the vehicle body frame, preferably covers a long distance with respect to the right front wheel and the left front wheel, each of which has such a wide movable range, so as to avoid interference therewith.

When the front end of the vehicle body cover is disposed behind the respective front ends of the right front wheel and the left front wheel arranged within a narrow space so as to make the vehicle body cover smaller in relation to the front-rear direction of the vehicle body frame, the vehicle body frame is likely to interfere with the right front wheel and the left front wheel. Thus, the lower end of the front portion of the vehicle body cover preferably is spaced far apart from the respective upper ends of the right front wheel and the left front wheel so as to avoid interference therewith.

However, by enlarging the spaces between the lower edge of the front portion of the vehicle body cover and the respective upper ends of the right front wheel and the left front wheel arranged within a narrow space, incoming objects tend to easily pass through such spaces. When attempting to prevent the entrance of the incoming objects into these areas while avoiding interference with the right front wheel and the left front wheel, the vehicle body cover preferably projects forward by a large distance, as a result of which the reduction in the size of the vehicle body cover in relation to the front-rear direction of the vehicle body frame is prevented.

Conditions in which the vehicle is subjected to incoming objects has been analyzed for each of the vehicle body covers having different shapes. As the results of the analysis, it has been discovered that incoming objects occasionally pass through the space defined between the upper edge of the right front wheel and the lower edge of the link mechanism or the steering mechanism that is directly above the right front wheel, and the space between the upper edge of the left front wheel and the lower edge of the link mechanism or the steering mechanism that is directly above the left front wheel, as seen from the front side in the front-rear direction of the vehicle body frame when the vehicle body frame is in the upright state. Additionally, it has also been discovered that the incoming objects occasionally reach an area behind the right front wheel and the left front wheel in relation to the front-rear direction of the vehicle body frame.

Further, it has also been discovered that the vehicle body cover provides both the function to cover at least a portion of the link mechanism and the function to prevent incoming objects from entering an area behind the right front wheel and the left front wheel. Then, the vehicle body cover is divided in accordance with the functions thereof into the portion (the link cover portion) that covers at least a portion of the link mechanism and the portion (the right protecting portion and the left protecting portion) that prevents incoming objects from entering into an area behind the right front wheel and the left front wheel. Then, suitable positions and shapes for each of the individual functional portions was considered.

In the vehicle including the leanable vehicle body frame and the link mechanism, the right front wheel and the left front wheel each have a wide movable range. Consequently, there may be a large change in the positions and sizes of the areas between the link mechanism and the right front wheel and between the link mechanism and the left front wheel in accordance with the operation of the link mechanism. When the portion that defines and serves as the protecting portions is configured so as not to be displaced relative to the vehicle body frame, as in a vehicle 1001 according to a comparison example shown in FIG. 20B, the protecting portion preferably covers the entire areas 1223 that change largely to shield the areas against incoming objects entering the areas. This enlarges the vehicle body cover.

The front cover 221, which is one example of a link cover portion provided on the vehicle 1, is provided so as not to be displaced relative to the vehicle body frame 21 and covers at least a portion of the link mechanism 5. At least a portion of the function that contributes to the reduction in wind pressure is separated from the front cover 221 to the right front fender 223R and the left front fender 223L, and this enhances the degree of freedom in designing the front cover 221. In addition, a portion of the functions provided by the front cover 221 is separated, and this enables the front cover 221 to be smaller in size. Specifically, the front cover 221 includes the front portion 221a that is disposed ahead of the rear ends WBR, WBL of the right front wheel 31 and the left front wheel 32 in the front-rear direction of the vehicle body frame 21. As seen from the front in the front-rear direction of the vehicle body frame 21 when the vehicle body frame 21 is in the upright state, the right lower edge CDER of the front portion 221a that is located in the upper side of the right front wheel 31 is disposed above the lower edge of the link mechanism 5 or the steering mechanism 7 in the up-down direction of the vehicle body frame 21. The left lower edge CDEL of the front portion 221a that is located in the upper side of the left front wheel 32 is disposed above the lower edge of the link mechanism 5 or the steering mechanism 7 in the up-down direction of the vehicle body frame 21. More specifically, the vehicle body cover 22 is made smaller in size in relation to the left-right direction of the vehicle body frame 21 by narrowing the space between the right front wheel 31 and the left front wheel 32. In addition to this, the vehicle body cover 22 is also made smaller in size in relation to the front-rear direction of the vehicle body frame 21.

Figure 20A:
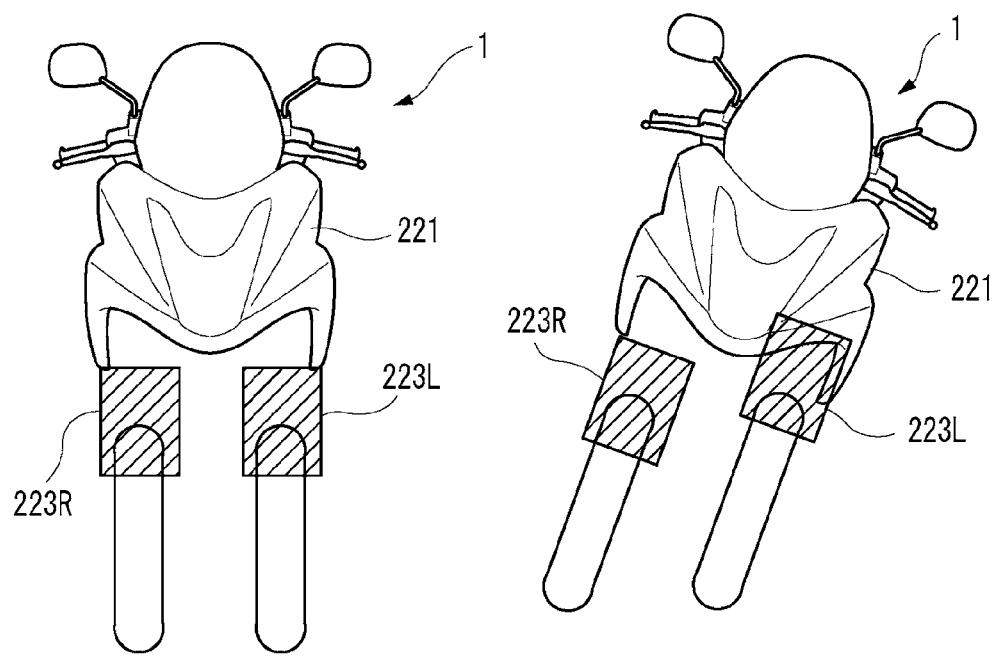
FIGS. 20A and 20B are views illustrating the effects of the right protecting portion and the left protecting portion provided on the vehicle shown in FIG. 1.
Figure 20B:
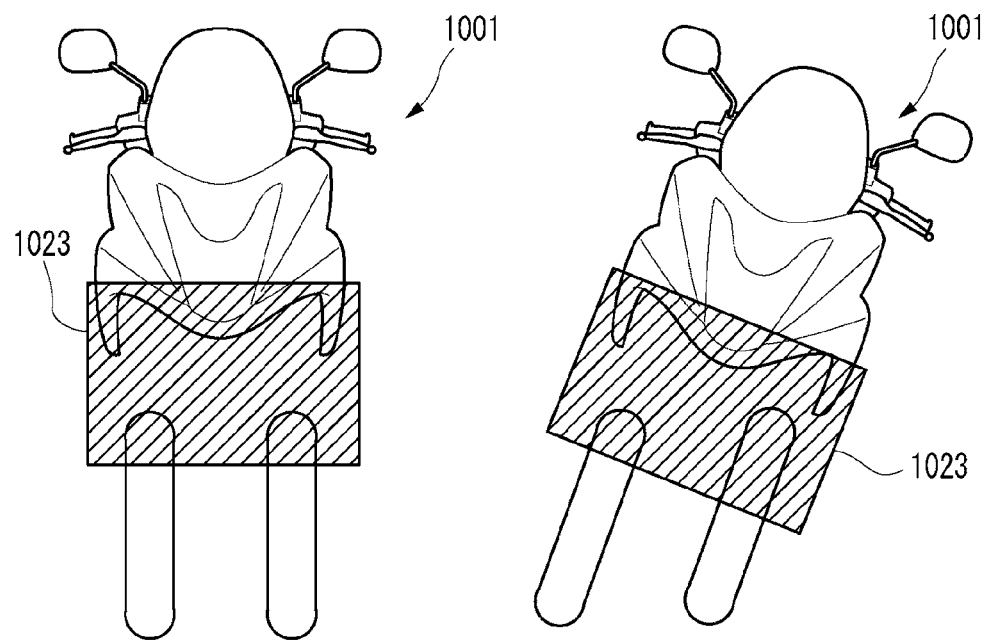

By reducing the size of the front cover 221 in relation to the front-rear direction of the vehicle body frame 21, relatively large spaces are provided individually between the right lower edge CDER of the front portion 221a of the front cover 221 and the upper edge WUER of the right front wheel 31, and between the left lower edge CDEL of the front portion 221a of the front cover 21 and the upper edge WUEL of the left front wheel 32. However, the vehicle 1 includes the right front fender 223R (one example of a right protecting portion) and the left front fender 223L (one example of a left protecting portion) configured so as to be displaced relative to the vehicle body frame 21 in accordance with the operation of the link mechanism 5. More specifically, as shown in FIG. 20A, even though the positions and sizes of the areas defined between the link mechanism 5 and the right front wheel 31 and between the link mechanism 5 and the left front wheel 32 change in accordance with the operation of the link mechanism 5, the right front fender 223R and the left front fender 223L are caused to move according to the changes in position and size.

In addition, as seen from the front in the front-rear direction of the vehicle body frame 21 when the vehicle body frame 21 is in the upright state, at least a portion of the right front fender 223R is disposed above the center CR in the up-down direction of the vehicle body frame 21 between the upper end WUR of the right front wheel 31 and the lower edge MDER of the link mechanism 5 or the steering mechanism 7 that is directly above the right front wheel 31, and is disposed below the right lower edge CDER of the front portion 221a of the front cover 221. As seen from the front in the front-rear direction of the vehicle body frame 21 of the vehicle 1 when the vehicle body frame 21 is in the upright state, at least a portion of the left front fender 223L is disposed above the center CL in the up-down direction of the vehicle body frame 21 between the upper end WUL of the left front wheel 32 and the lower edge MDEL of the link mechanism 5 or the steering mechanism 7 that is directly above the left front wheel 32, and is disposed below the left lower edge CDEL of the front portion 221a of the front cover 221. According to this configuration, the right front fender 223R and the left front fender 223L easily prevent incoming objects from entering an area behind the right front wheel 31 and the left front wheel 32. Consequently, the right front fender 223R and the left front fender 223L are made smaller in size, even though the right front fender 223R and the left front fender 223L provide the same protecting function as that of the protecting portion that is configured so as not to be displaced relative to the vehicle body frame 21 irrespective of how the link mechanism 5 operates. Thus, even though the right front fender 223R and the left front fender 223L are made smaller in size, it is possible to prevent incoming objects from entering an area behind the right front wheel 31 and the left front wheel 32. In addition, it is possible to prevent incoming objects from entering the behind-front-wheels area S.

Thus, as has been described above, the front cover 221 is made smaller in size by separating at least a portion of the function to prevent incoming objects from entering an area behind the right front wheel 31 and the left front wheel 32. In addition, the right front fender 223R and the left front fender 223L that prevent incoming objects from entering an area behind the right front wheel 31 and the left front wheel 32 is smaller by providing the right front fender 223R and the left front fender 223L so as to be displaced relative to the vehicle body frame 21 in accordance with the operation of the link mechanism 5. Consequently, the front portion of the vehicle 1 is made smaller in size while ensuring the protecting function of the vehicle 1 that includes the leanable vehicle body frame 21 and the two front wheels 3 against incoming objects.

The expressions "divide" and "separate" used in the above explanations are not intended to exclusively mean a case where the function to cover at least a portion of the link mechanism 5 is completely divided or separated from the function to prevent incoming objects from entering an area behind the right front wheel 31 and the left front wheel 32. It is not excluded a case where the front cover 221 has the function to prevent incoming objects from entering an area behind the right front wheel 31 and the left front wheel 32. It is not excluded a case where each of the right front fender 223R and the left front fender 223L has the function to cover at least a portion of the link mechanism 5.

In the present preferred embodiment, as shown in FIG. 17, as seen from the front in the front-rear direction of the vehicle body frame 21 when the vehicle body frame 21 is in the upright state, at least a portion of the right front fender 223R is disposed below the center CR in the up-down direction of the vehicle body frame 21 between the upper end WUR of the right front wheel 31 and the lower edge MDER of the link mechanism 5 or the steering mechanism 7 that is directly above the right front wheel 31, and is disposed above the upper edge WUER of the right front wheel 31.

In addition, as seen from the front in the front-rear direction of the vehicle body frame 21 when the vehicle body frame 21 is in the upright state, at least a portion of the left front fender 223L is disposed below the center CL in the up-down direction of the vehicle body frame 21 between the upper end WUL of the left front wheel 32 and the lower edge MDEL of the link mechanism 5 or the steering mechanism 7 that is directly above the left front wheel 32, and is disposed above the upper edge WUEL of the left front wheel 32.

According to the arrangement described above, as seen from the front in the front-rear direction of the vehicle body frame 21 when the vehicle body frame 21 is in the upright state, at least a portion of the right front fender 223R is disposed below the center CR in the up-down direction of the vehicle body frame 21 between the upper end WUR of the right front wheel 31 and the lower edge MEDR of the link mechanism 5 or the steering mechanism 7 that is directly above the right front wheel 31, and is disposed above the upper edge WUER of the right front wheel 31. Since the right front fender 223R that is configured so as to be displaced relative to the vehicle body frame is disposed both above and below the center CR, the protecting function is ensured even though the right front fender 223R is small. In addition, the function to protect the behind-front-wheels area S is ensured.

Here, the portion below the center CR is spaced farther apart from the front cover 221 that is configured so as not to be displaced relative to the vehicle body frame 21 than the portion above the center CR. Accordingly, even though a portion of the right front fender 223R is disposed below the center CR, interference of the right front fender 223R with the front cover 221 is avoided.

In addition, as seen from the front in the front-rear direction of the vehicle body frame 21 when the vehicle body frame 21 is in the upright state, at least a portion of the left front fender 223L is disposed below the center CL in the up-down direction of the vehicle body frame 21 between the upper end WUL of the left front wheel 32 and the lower edge MDEL of the link mechanism 5 or the steering mechanism 7 that is directly above the left front wheel 32, and is disposed above the upper edge WUEL of the left front wheel 32. Since the left front fender 223L that is configured so as to be displaced relative to the vehicle body frame 21 is disposed both above and below the center CL, the protecting function is ensured even though the left front fender 223L is small. In addition, the function to protect the behind-front-wheels area S is ensured. Here, the portion below the center CL is spaced farther apart from the front cover 221 that is configured so as not to be displaced relative to the vehicle body frame 21 than the portion above the center CL. Accordingly, even though a portion of the left front fender 223L is disposed below the center CL, interference of the left front fender 223L with the front cover 221 is avoided.

Consequently, the front portion of the vehicle 1 is made smaller in size while ensuring the protecting function of the vehicle 1 that includes the leanable vehicle body frame 21 and the two front wheels 3 against incoming objects.

In the present preferred embodiment, as shown in FIG. 6, at least a portion of the right front fender 223R is disposed behind the front end WFR of the right front wheel 31 in the front-rear direction of the vehicle body frame 21 when the vehicle body frame 21 is in the upright state. In addition, at least a portion of the left front fender 223L is disposed behind the front end WFL of the left front wheel 32 in the front-rear direction of the vehicle body frame 21 when the vehicle body frame 21 is in the upright state.

According to the arrangement described above, since the right front fender 223R is disposed behind the front end of the right front wheel 31, the right front fender 223R is made smaller in size while preventing incoming objects from entering an area behind the right front wheel 31. In addition, the right front fender 223R is made smaller in size while preventing incoming objects from entering the behind-front-wheels area S. Further, the right front wheel 31 and the right front fender 223R are closer to each other while avoiding interference of the displacing right front wheel 31 with the right front fender 223R. This enables the vehicle 1 that includes the right front fender 223R to be made smaller in size.

In addition, since the left front fender 223L is disposed behind the front end of the left front wheel 32, the left front fender 223L is made smaller in size while preventing incoming objects from entering an area behind the left front wheel 32. In addition, the left front fender 223L is made smaller in size while preventing incoming objects from entering the behind-front-wheels area S. Further, the left front wheel 32 and the left front fender 223L are closer to each other while avoiding interference of the displacing left front wheel 32 with the left front fender 223L. This enables the vehicle 1 that includes the left front fender 223L to be made smaller in size.

Consequently, the front portion of the vehicle 1 is made smaller in size while ensuring the protecting function of the vehicle 1 that includes the leanable vehicle body frame 21 and the two front wheels 3 against incoming objects.

In the present preferred embodiment, as shown in FIG. 6, at least a portion of the right front fender 223R is disposed behind the rear end WBR of the right front wheel 31 in the front-rear direction of the vehicle body frame 21 when the vehicle body frame 21 is in the upright state. Further, at least a portion of the left front fender 223L is disposed behind the rear end WBL of the left front wheel 32 in the front-rear direction of the vehicle body frame 21 when the vehicle body frame 21 is in the upright state.

According to this arrangement, since the right front fender 223R is disposed ahead of the rear end of the right front wheel 31, the right front fender 223R is made small in size while preventing incoming objects from entering an area behind the right front wheel 31. In addition, the right front fender 223R is made smaller in size while preventing incoming objects from entering the behind-front-wheels area S. Further, the right front wheel 31 and the right front fender 223R are closer to each other while avoiding interference of the displacing right front wheel 31 with the right front fender 223R. This enables the vehicle 1 that includes the right front fender 223R to be made smaller in size.

In addition, since the left front fender 223L is disposed ahead of the rear end of the left front wheel 32, the left front fender 223L is made small in size while preventing incoming objects from entering an area behind the left front wheel 32. In addition, the left front fender 223L is made smaller in size while preventing incoming objects from entering the behind-front-wheels area S. Further, the left front wheel 32 and the left front fender 223L are closer to each other while avoiding interference of the displacing left front wheel 32 with the left front fender 223L. This enables the vehicle 1 that includes the left front fender 223L to be made smaller in size.

Consequently, the front portion of the vehicle 1 is made smaller in size while ensuring the protecting function of the vehicle 1 that includes the leanable vehicle body frame 21 and the two front wheels 3 against incoming objects.

Figure 18:
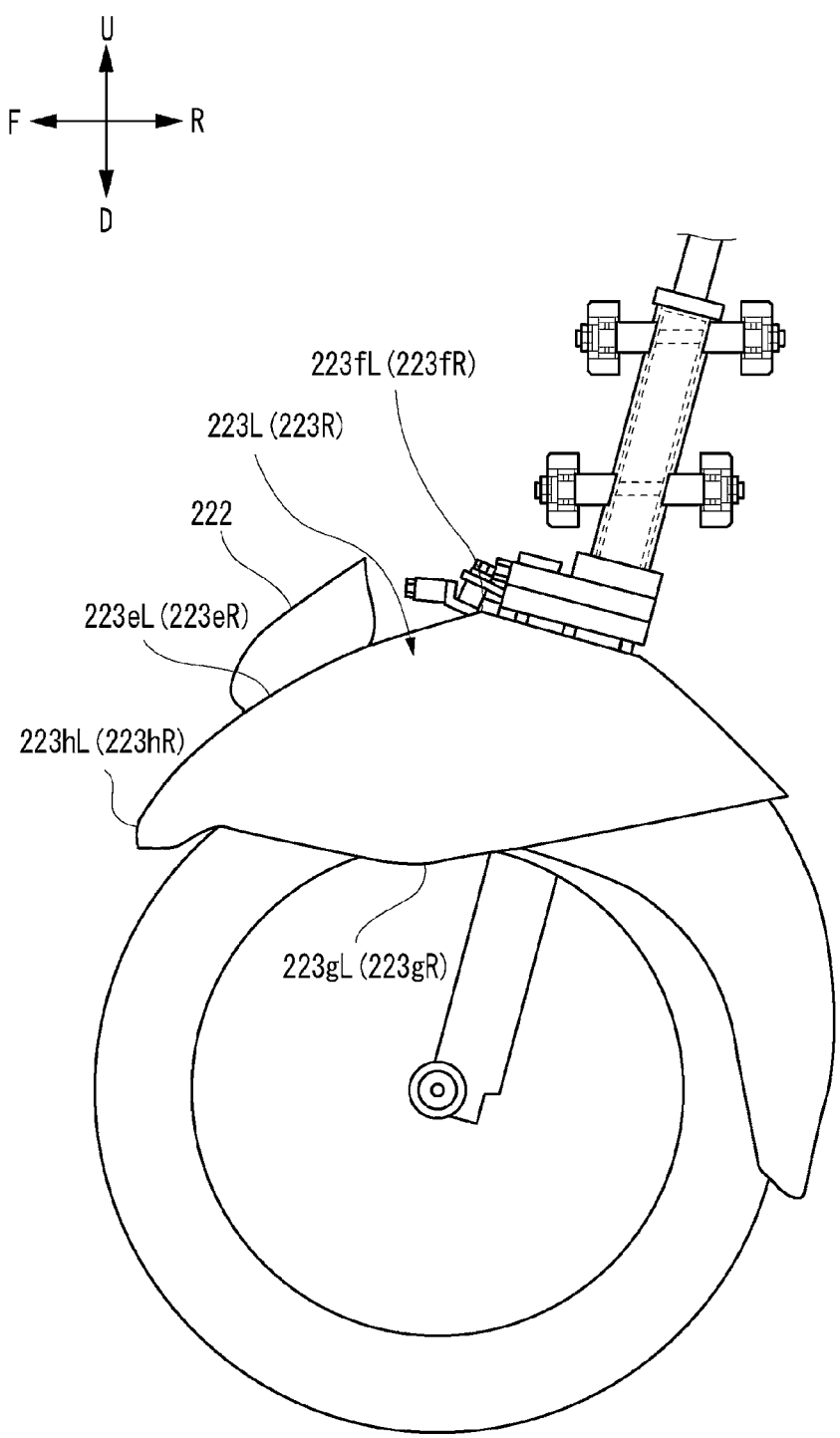
FIG. 18 is a view illustrating the shapes of the right protecting portion and the left protecting portion provided on the vehicle shown in FIG. 1.

In the present preferred embodiment, as shown in FIG. 18, as seen from the side of the vehicle body frame 21 when the vehicle body frame 21 is in the upright state, a front edge 223eL of the left front fender 223L is inclined so that at least either of an upper end 223fL and a lower end 223gL is positioned behind a front end 223hL. Similarly, as seen from the side of the vehicle body frame 21 when the vehicle body frame 21 is in the upright state, a front edge 223eR of the right front fender 223R is inclined so that at least either of an upper end 223fR and a lower end 223gR is positioned behind a front end 223hR.

Here, the "front edge 223eL of the left front fender 223L" denotes a contour portion that extends from the upper end 223fL to the lower end 223gL. In FIG. 18, the contour portion appears in an area directly ahead of the vehicle body frame 21 in the front-rear direction. Here, the "front edge 223eR of the right front fender 223R" denotes a contour portion that extends from the upper end 223fR to the lower end 223gR. In FIG. 18, the contour portion appears in an area directly ahead of the vehicle body frame 21 in the front-rear direction.

According to the configuration described above, incoming objects are deflected in the up-down direction of the vehicle body frame along the inclined portions of the right front fender 223R and the left front fender 223L. With this configuration, it is possible to prevent incoming objects from entering an area behind the right front wheel 31 and the left front wheel 32. In addition, it is possible to prevent incoming objects from entering the behind-front-wheels area S. This enables the right front fender 223R and the left front fender 223L to be made smaller in size. Consequently, the front portion of the vehicle 1 is made smaller in size while ensuring the protecting function of the vehicle 1 that includes the leanable vehicle body frame and the two front wheels against incoming objects.

In the present preferred embodiment, as shown in FIG. 19, as seen from above the vehicle body frame 21 when the vehicle body frame 21 is in the upright state, the front edge 223eR of the right front fender 223R is inclined so that at least either of a right end 223iR and a left end 223jR is positioned behind the front end 223hR. In addition, as seen from above of the vehicle body frame 21 when the vehicle body frame 21 is in the upright state, the front edge 223eL of the left front fender 223L is inclined so that at least either of a right end 223iL and a left end 223jL is positioned behind the front end 223hL.

Here, the "front edge 223eL of the left front fender 223L" denotes a contour portion that extends from the right end 223iL to the left end 223jL. In FIG. 19, the contour portion appears in an area directly ahead of the vehicle body frame 21 in the front-rear direction. In addition, the "front edge 223eR of the right front fender 223R" denotes a contour portion that extends from the right end 223iR to the left end 223jR. In FIG. 19, the contour portion appears in an area directly ahead of the vehicle body frame 21 in the front-rear direction.

According to the configuration described above, incoming objects are deflected in the left-right direction of the vehicle body frame along the inclined portions of the right front fender 223R and the left front fender 223L. With this configuration, it is possible to prevent incoming objects from entering an area behind the right front wheel 31 and the left front wheel 32. In addition, it is possible to prevent incoming objects from entering the behind-front-wheels area S. This enables the right front fender 223R and the left front fender 223L to be made smaller in size. Consequently, the front portion of the vehicle 1 is made smaller in size while ensuring the protecting function of the vehicle 1 that includes the leanable vehicle body frame and the two front wheels against incoming objects.

In the present preferred embodiment, the right front fender 223R includes at least a portion of a fender function to cover at least a portion of an upper surface of the right front wheel 31 and to prevent the scattering of muddy water or the like that is kicked up by the right front wheel 31. In addition, the left front fender 223L includes at least a portion of a fender function to cover at least a portion of an upper surface of the left front wheel 32 and to prevent the scattering of muddy water or the like that is kicked up by the left front wheel 32.

According to the configuration described above, it is possible to prevent directly incoming objects from entering an area behind the right front wheel 31 and the left front wheel 32. In addition, it is possible to prevent incoming objects from entering the behind-front-wheels area S. Thus, it is possible to provide the right front fender 223R and the left front fender 223L that have the functions to prevent incoming objects from entering an area behind the right front wheel 31 and the left front wheel 32 small in size. Further, a portion of the fender function for the right front wheel 31 is provided by the right front fender 223R, and portion of the fender function for the left front wheel 32 is provided by the left front fender 223L, such that the degree of freedom in designing the right front fender 223R, the right protecting portion, the left front fender 223L, and the left protecting portion is improved. Additionally, with the configuration described above, a portion of the function of the right protecting portion is provided by the right front fender 223R for the right front wheel 31, and a portion of the function of the left protecting portion is provided by the left front fender 223L for the left front wheel 32, such that the degree of freedom in designing the right front fender 223R, the right protecting portion, the left front fender 223L, and the left protecting portion is improved. According to this configuration, as compared with a case where individual elements are prepared for each of the functions, the overall configuration is made smaller while ensuring the same functions. Consequently, the front portion of the vehicle 1 is made smaller in size while ensuring the protecting function of the vehicle 1 that includes the leanable vehicle body frame and the two front wheels against incoming objects.

In the present preferred embodiment, as has been described with reference to FIGS. 5 and 6, the right front fender 223R and the left front fender 223L are fixed to the right bracket 317 and the left bracket 327, respectively.

According to this configuration, since the right front fender 223R and the left front fender 223L are moved directly in accordance with the operation of the link mechanism 5, the right front fender 223R and the left front fender 223L are easy to be made small in size. Consequently, the front portion of the vehicle 1 is made smaller in size while ensuring the protecting function of the vehicle 1 that includes the leanable vehicle body frame 21 and the two front wheels 3 against incoming objects.

The portion defining and serving as the right protecting portion is preferably fixed to a portion other than the right bracket 317 as long as the portion is disposed above the center CR in the up-down direction of the vehicle body frame 21 between the upper end WUR of the right front wheel 31 and the lower edge MDER of the link mechanism 5 or the steering mechanism 7 that is directly above the right front wheel 31, and is disposed below the right lower edge CDER of the front portion 221a of the front cover 221, as seen from the front in the front-rear direction of the vehicle body frame 21 when the vehicle body frame 21 is in the upright state. The portion defining and serving as the right protecting portion is preferably fixed to, for example, any one of the link mechanism 5, the right shock absorber 33, and the steering force transmission mechanism 6. It should be noted that the link mechanism 5 includes the head pipe 211, the lower cross member 52, and the right side member 53. In addition, the steering force transmission mechanism 6 includes the middle transmission plate 61, the right transmission plate 62, the middle joint 64, the right joint 65, and the tie rod 67.

The portion defining and serving as the left protecting portion is preferably fixed to a portion other than the left bracket 327 as long as the portion is disposed above the center CL in the up-down direction of the vehicle body frame 21 between the upper end WUL of the left front wheel 32 and the lower edge MDEL of the link mechanism 5 or the steering mechanism 7 that is directly above the left front wheel 32, and is disposed below the left lower edge CDEL of the front portion 221a of the front cover 221, as seen from the front in the front-rear direction of the vehicle body frame 21 when the vehicle body frame 21 is in the upright state. The portion defining and serving as the left protecting portion is preferably fixed to, for example, any one of the link mechanism 5, the left shock absorber 35, and the steering force transmission mechanism 6. It should be noted that the link mechanism 5 includes the head pipe 211, the lower cross member 52, and the left side member 54. In addition, the steering force transmission mechanism 6 includes the middle transmission plate 61, the left transmission plate 63, the middle joint 64, the left joint 66, and the tie rod 67.

Figure 11:
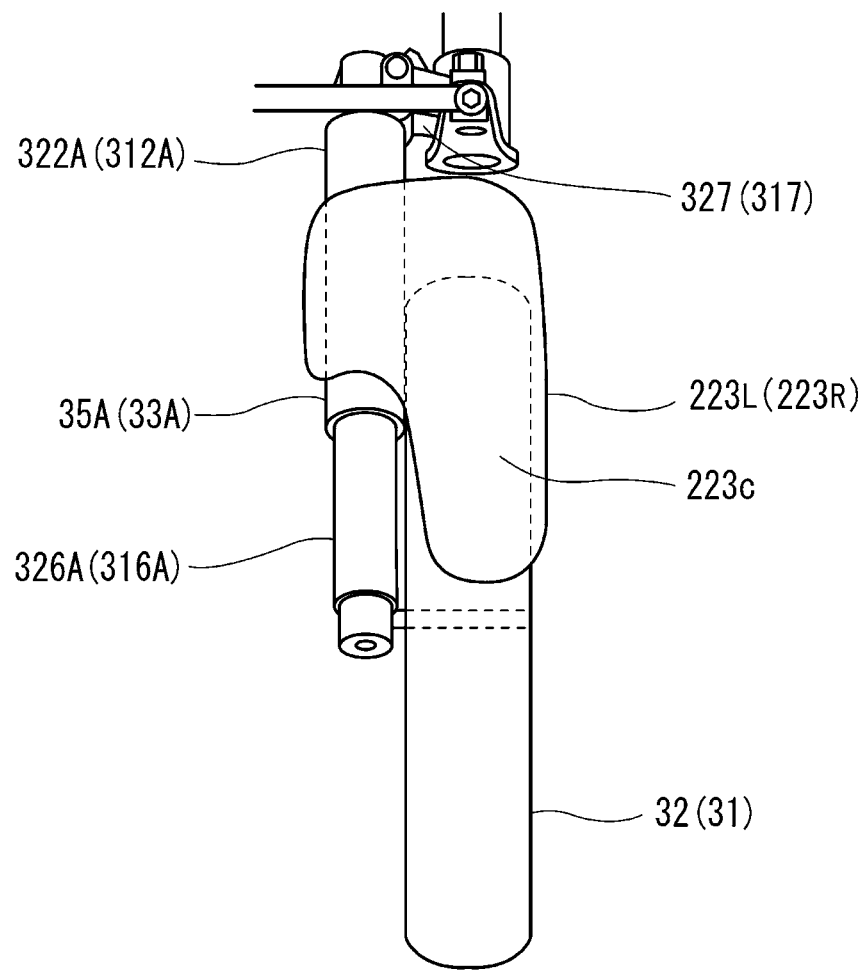
FIG. 11 is a view showing a modified example of the vehicle shown in FIG. 1.

For example, in a modified example shown in FIG. 11, aright front fender 223R and a left front fender 223L are fixed to upper portions of left and right shock absorbers, respectively.

A left shock absorber 35A according to the modified example includes a left outer tube 322A (one example of the upper portion of the left shock absorber) and a left inner tube 326A (one example of the lower portion of the left shock absorber). An upper portion of the left outer tube 322A is fixed to a left bracket 327. The left inner tube 326A is disposed directly below the left outer tube 322A when that portion of the left inner tube 326A is inserted into the left outer tube 322A. The left inner tube 326A supports a left front wheel 32.

The left front fender 223L according to the modified example includes a portion that extends farther rightward in a left-right direction of a vehicle body frame 21 than the left front wheel 32, as seen from the front of the vehicle 1 when the vehicle body frame 21 is in the upright state. The left front fender 223L is fixed to the left outer tube 322A.

Although not shown, a right shock absorber 33A according to the modified example preferably has a configuration that is symmetrical with that of the left shock absorber 35A in relation to the left-right direction. More specifically, the right shock absorber 33A according to the modified example includes aright outer tube 312A (one example of the upper portion of the right shock absorber) and a right inner tube 316A (one example of the lower portion of the right shock absorber). An upper portion of the right outer tube 312A is fixed to a right bracket 317. The right inner tube 316A is disposed directly below the right outer tube 312A when that portion of the right inner tube 316A is inserted in the right outer tube 312A. The right inner tube 316A supports a right front wheel 31.

Although not shown, the right front fender 223R preferably has a configuration that is symmetrical with that of the left front fender 223L in relation to the left-right direction. More specifically, the right front fender 223R includes a portion that extends farther leftward in the left-right direction of the vehicle body frame 21 than the right front wheel 31, as seen from the front of the vehicle 1 when the vehicle body frame 21 is in the upright state. The right front fender 223R is fixed to the right outer tube 312A.

According to the configuration described above, even though the right front wheel 31 and the left front wheel 32 are displaced in the up-down direction of the vehicle body frame 21 in accordance with the operation of the right shock absorber 33 and the left shock absorber 35, the right front fender 223R and the left front fender 223L are prevented from being displaced in the same direction in association with the vertical displacement of the right front wheel 31 and the left front wheel 32. This enables the right front fender 223R and the left front fender 223L to be made smaller in size. Consequently, the front portion of the vehicle 1 is made smaller in size while ensuring the protecting function of the vehicle 1 that includes the leanable vehicle body frame 21 and the two front wheels 3 against incoming objects.

Figure 13A:
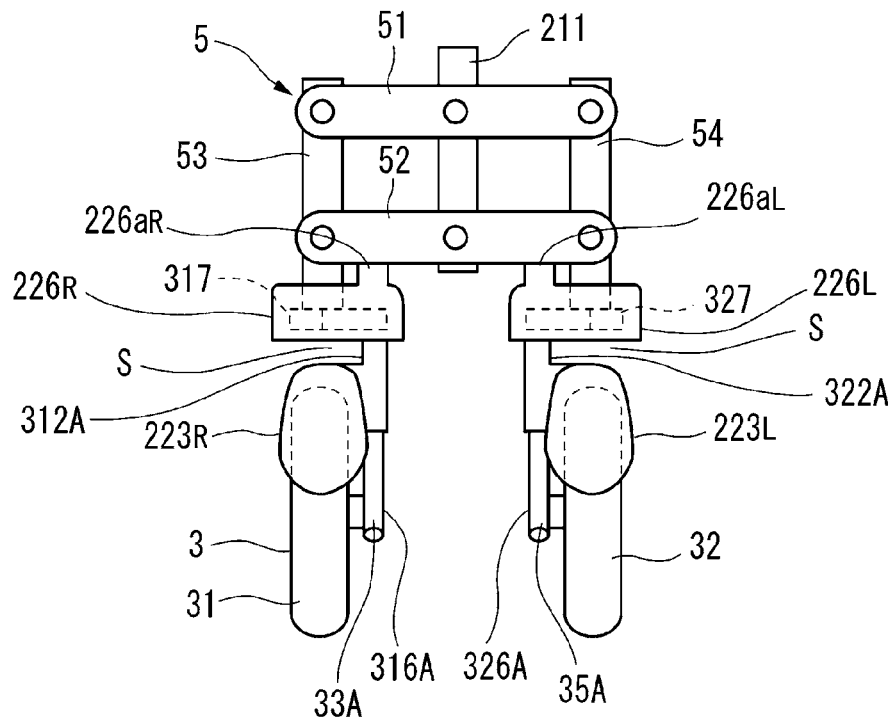
FIGS. 13A and 13B are views showing a modified example of the vehicle shown in FIG. 1.
Figure 13B:
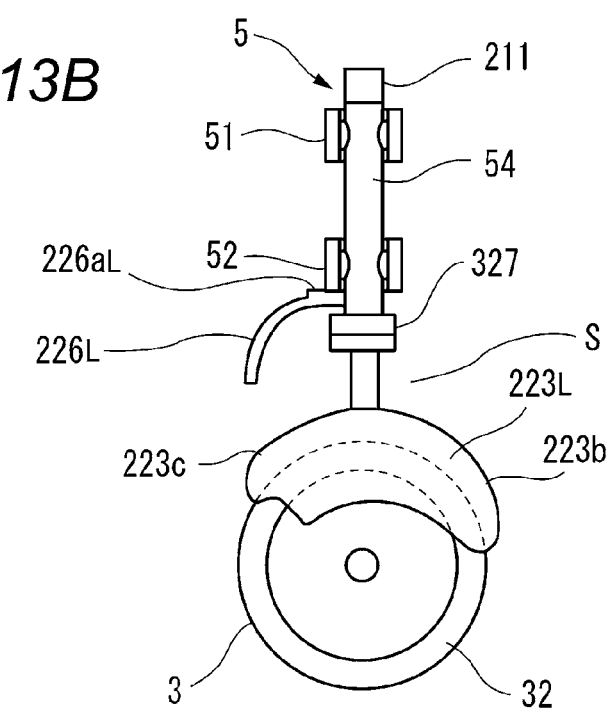

In another modified example shown in FIGS. 13A and 13B, a vehicle body cover 22 includes a right protecting cover 226R (one example of the right protecting portion) and a left protecting cover 226L (one example of the left protecting portion). The right protecting cover 226R and the left protecting cover 226L are fixed individually to a link mechanism 5. FIG. 13A is a front view wherein the configuration is seen from the front in a front-rear direction of the vehicle body frame 21. FIG. 13B is a left side view wherein the configuration is seen from the left in a left-right direction of the vehicle body frame 21.

The right protecting cover 226R and the left protecting cover 226L are preferably made from synthetic resin or the like. The right protecting cover 226R includes a right fixing portion 226aR at an upper portion thereof. The right protecting cover 226R is fixed to a lower cross member 52 of the link mechanism 5 via the right fixing portion 226aR. The left protecting cover 226L includes a left fixing portion 226aL at an upper portion thereof. The left protecting cover 226L is fixed to the lower cross member 52 of the link mechanism 5 via the left fixing portion 226aL.

The shape of the right front fender 223R may be appropriately selected as long as at least a portion of the right front fender 223R is disposed above a center CR in an up-down direction of the vehicle body frame 21 between an upper end WUR of the right front wheel 31 and a lower edge MDER of the link mechanism 5 or a steering mechanism 7 that is directly above a right front wheel 31, and is disposed below a right lower edge CDER of a front portion 221a of a front cover 221, as seen from the front in the front-rear direction of the vehicle body frame 21 when the vehicle body frame 21 is in an upright state.

The shape of the left front fender 223L may be appropriately selected as long as at least a portion of the left front fender 223L is disposed above a center CL in the up-down direction of the vehicle body frame 21 between an upper end WUL of the left front wheel 32 and a lower edge MDEL of the link mechanism 5 or the steering mechanism 7 that is directly above a left front wheel 32, and is disposed below a left lower edge CDEL of the front portion 221a of the front cover 221, as seen from the front in the front-rear direction of the vehicle body frame 21 when the vehicle body frame 21 is in the upright state.

Figure 9A:
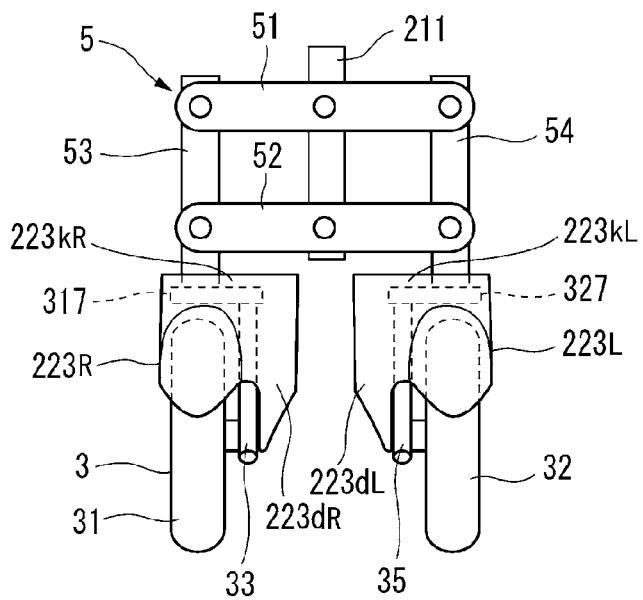
FIGS. 9A, 9B, and 9C are views showing a modified example of the vehicle shown in FIG. 1.
Figure 9B:
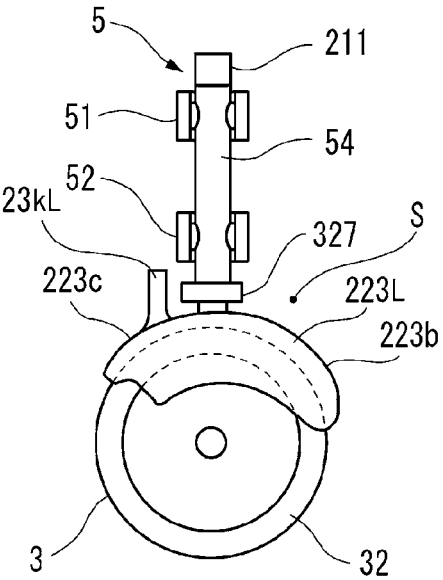
Figure 9C:
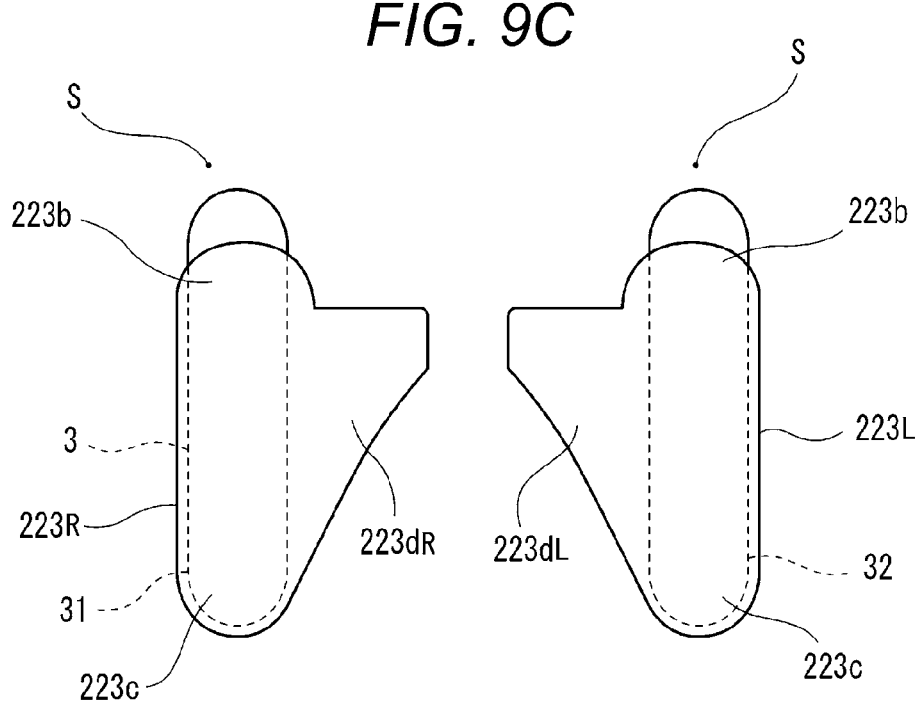
Figure 10A:
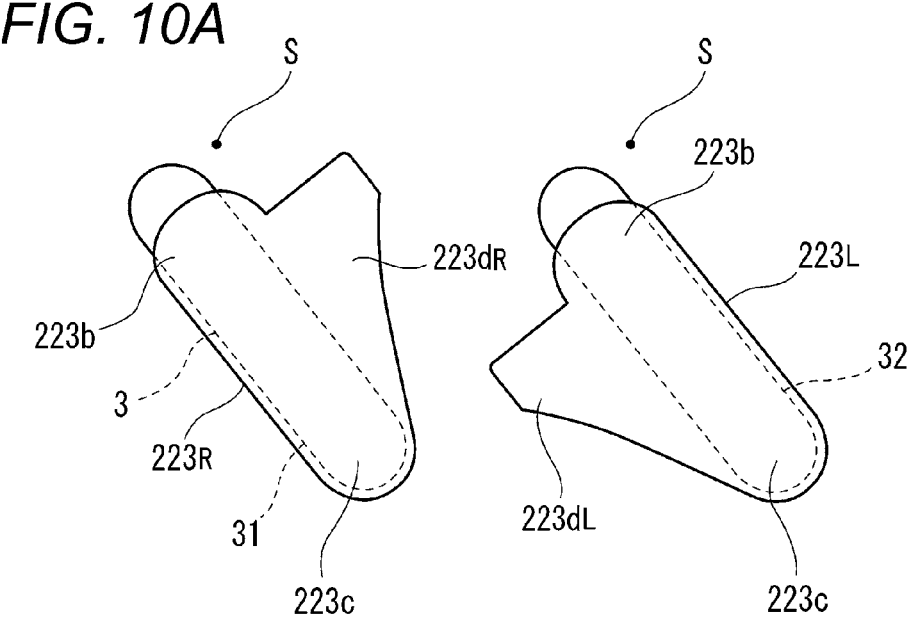
FIGS. 10A and 10B are views showing a modified example of the vehicle shown in FIG. 1.
Figure 10B:
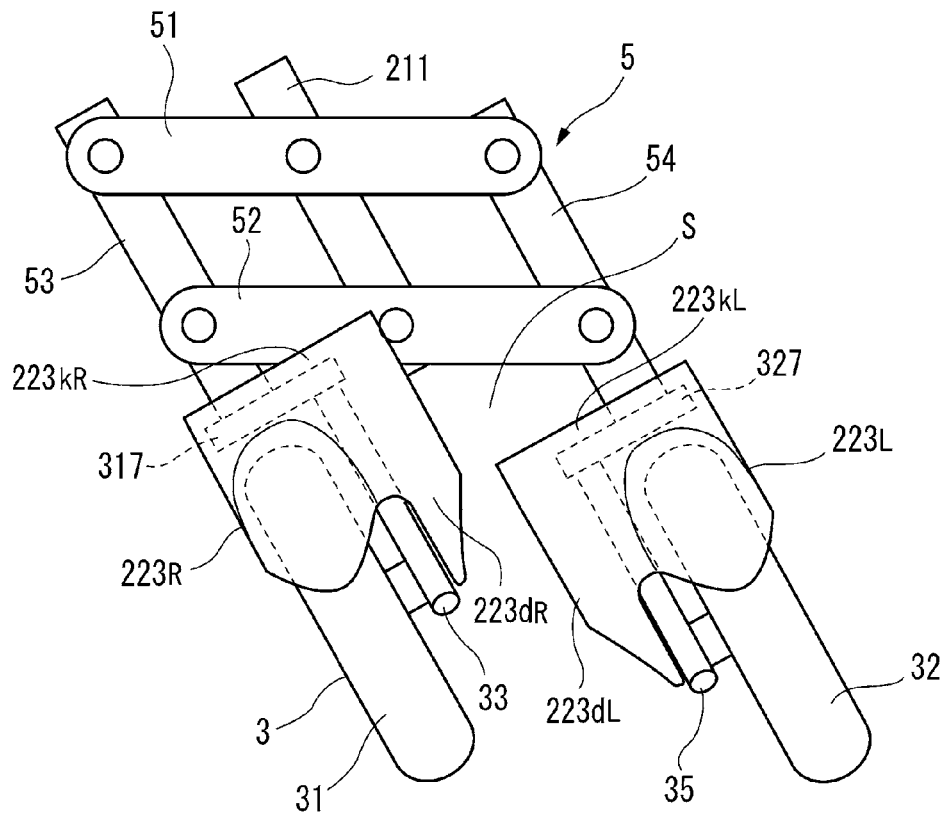

Referring to FIGS. 9A-9C, 10A, and 10B, such a modified example will be described. FIGS. 9A-9C, 10A, and 10B are front views that schematically show a portion of the configuration of the modified example. FIG. 9A is a front view wherein the configuration is seen from the front in a front-rear direction of the vehicle body frame 21. FIG. 9B is a left side view wherein the configuration is seen from the left in a left-right direction of the vehicle body frame 21. FIG. 9C is a plan view wherein a right front fender 223R and a left front fender 223L according this modified example are seen from above in an up-down direction of the vehicle body frame 21.

The right front fender 223R according to the modified example includes a first right projecting portion 223dR that extends farther leftward in the left-right direction of the vehicle body frame 21 than a right front wheel 31, and includes a second projecting portion 223kR that extends farther upward in the up-down direction of the vehicle body frame 21 than the right front wheel 31, as seen from the front of the vehicle 1 when the vehicle body frame 21 is in the upright state.

The left front fender 223L according to the modified example includes a first left projecting portion 223dL that extends farther rightward in the left-right direction of the vehicle body frame 21 than a left front wheel 32, and includes a second projecting portion 223kL that extends farther upward in the up-down direction of the vehicle body frame 21 than the left front wheel 32, as seen from the front of the vehicle 1 when the vehicle body frame 21 is in the upright state.

The first right projecting portion 223dR, the second right projecting portion 223kR, the first left projecting portion 223dL, and the second left projecting portion 223kL are configured so as to be displaced relative to the vehicle body frame 21 in accordance with the operation of a steering mechanism 7. As shown in FIG. 7, when the rider operates the handlebar 23, via the steering force transmission mechanism 6, the right bracket 317 and the left bracket 327 are turned relative to the right side member 53 and the left side member 54 about the right center axis X and the left center axis Y, respectively. This causes the right front fender 223R and the left front fender 223L that are connected to the right bracket 317 and the left bracket 327 via the stud bolts 223a to turn about the right center axis X and the left center axis Y relative to the right side member 53 and the left side member 54. Consequently, the first right projecting portion 223dR, the second right projecting portion 223kR, the first left projecting portion 223dL, and the second left projecting portion 223kL are displaced in the left-right direction of the vehicle body frame 21 in accordance with the operation of the steering mechanism 7.

As shown in FIG. 8, when the rider causes the vehicle 1 to lean leftward, the link mechanism 5 operates. The positions of the right bracket 317 and the left bracket 327 relative to the vehicle body frame 21 are changed in the up-down direction of the vehicle body frame 21 in accordance with the operation of the link mechanism 5. This causes the right front fender 223R and the left front fender 223L that are fixed to the right bracket 317 and the left bracket 327, respectively, to change their relative positions to the vehicle body frame 21 in the up-down direction of the vehicle body frame 21. Consequently, the first right projecting portion 223dR, the second right projecting portion 223kR, the first left projecting portion 223dL, and the second left projecting portion 223kL are configured so as to be displaced relative to the vehicle body frame 21 in accordance with the operation of the link mechanism 5.

The first right projecting portion 223dR and the second left projecting portion 223dL are disposed and shaped so that the first right projecting portion 223dR and the first left projecting portion 223dL are prevented from interfering with each other even though the first right projecting portion 223dR and the first left projecting portion 223dL are displaced relative to the vehicle body frame 21 according to the steering operation and the leaning operation that are described above.

The right front fender 223R is preferably fixed to a right outer tube 312 (one example of the lower portion of the right shock absorber) of a right shock absorber 33. The left front fender 223L is preferably fixed to a left outer tube 322 (one example of the lower portion of the left shock absorber) of a left shock absorber 35. Here, the right front fender 223R is also preferably displaced relative to the vehicle body frame 21 by being displaced in the same direction as a right shock absorber 33 extends or contract. Similarly, the left front fender 223L is also preferably displaced relative to the vehicle body frame 21 by being displaced in the same direction as a left shock absorber 35 extends or contract.

Figure 12:
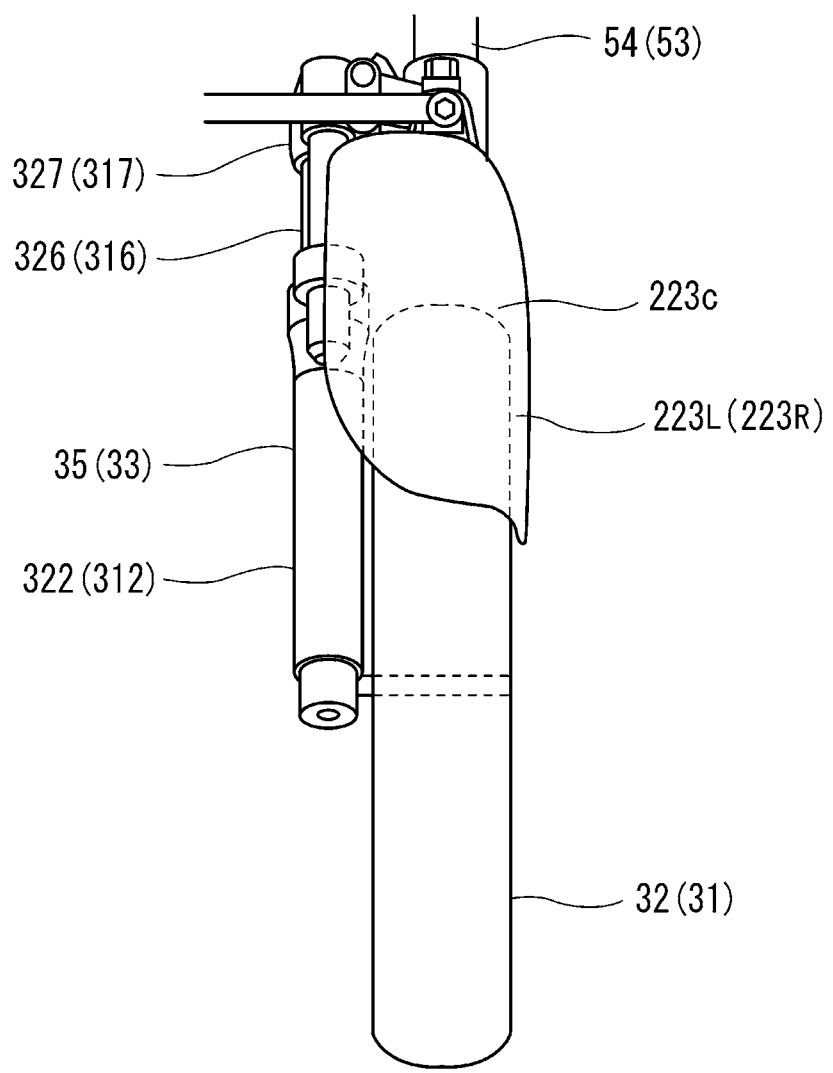
FIG. 12 is a view showing a modified example of the vehicle shown in FIG. 1.

Additionally, as shown in one example shown in FIG. 12, the left front fender 223L is preferably integral and unitary with the left bracket 327. Although not shown, the right front fender 223R according to this modified example is also preferably integral and unitary with the right bracket 317.

The terms and expressions that are used herein are used to describe the preferred embodiments of the present invention and hence should not be construed as limiting the scope of the present invention. It should be understood that any equivalents to the characteristic matters that are shown and described herein should not be excluded and that various modifications made within the scope of claims to be made later are permitted.

The expressions "divide" and "separate" used in the above explanations are not intended to exclusively mean a case where the function to cover at least a portion of the link mechanism is completely divided or separated from the function to prevent incoming objects from entering an area behind the right front wheel and the left front wheel. It is not excluded a case where the link cover portion has the function to prevent incoming objects from entering an area behind the right front wheel and the left front wheel. It is not excluded a case where each of the right protecting portion and the left protecting portion has the function to cover at least a portion of the link mechanism.

When referred to in this specification, the "parallel" line also includes two straight lines which do not intersect each other as members while they are inclined within the range of about ±40 degrees, for example. When referred to in relation to the "direction," and the "member" in the present invention, the term "along" also includes a case where the direction and the member are inclined within the range of about ±40 degrees, for example. When referred to in relation to the "direction" in the invention, the term "extend" also includes a case where the direction is inclined within the range of about ±40 degrees, for example.

The present invention is implemented with many different preferred embodiments. This disclosure should be regarded as provision of the preferred embodiments based on the principle of the present invention. Based on the understanding that the preferred embodiments which are described and/or illustrated herein are not intended to limit the present invention thereto, several preferred embodiments are described and illustrated herein.

Several illustrated preferred embodiments of the present invention are described herein. The present invention should not be limited to the preferred embodiments described herein. The present invention includes every preferred embodiment that includes equivalent elements, modifications, deletions, combinations (for example, combinations of characteristics that are common to various preferred embodiments), improvements and/or modifications that those skilled in the art to which the invention pertains can recognize based on the disclosure made herein. Matters limited by claims should be construed widely based on terms that are used in the claims and should not be limited to the preferred embodiments described in this description or the prosecution of this patent application. Such preferred embodiments are interpreted to be non-exclusive. For example, in this disclosure, the terms "preferred," "preferable" and "good" should be construed as being non-exclusive and those terms mean, respectively, "preferred but not limited to," "preferable but not limited thereto" and "good but not limited thereto."

The vehicle according to preferred embodiments of the present invention is preferably a vehicle including a leanable vehicle body frame and two front wheels. The number of rear wheels is not limited to one, and may be two.

In a preferred embodiment, a center in the left-right direction of the vehicle body frame 21 of the rear wheel 4 coincides with a center in the left-right direction of the vehicle body frame 21 of the space defined between the right front wheel 31 and the left front wheel 32. Although the configuration described above is preferred, the center in the left-right direction of the vehicle body frame 21 of the rear wheel 4 does not have to coincide with the center in the left-right direction of the vehicle body frame 21 of the space defined between the right front wheel 31 and the left front wheel 32.

The link mechanism 5 may further include a cross member other than the upper cross member 51 and the lower cross member 52. The "upper cross member" and the "lower cross member" are merely so called based on their relative positions in the up-down direction. The upper cross member is not necessarily an uppermost cross member of the link mechanism 5. The upper cross member means a cross member that is above another cross member that is below. The lower cross member is not necessarily a lowermost cross member of the link mechanism 5. The lower cross member means a cross member that is below another cross member that is above. At least one of the upper cross member 51 and the lower cross member 52 may be made up of two portions such as a right cross member and a left cross member. In this way, the upper cross member 51 and the lower cross member 52 may be made up of a plurality of cross members, as long as the linkage function is realized.

The portion that defines and serves as the right protecting portion does not have to be the right front fender 223R or the right protecting cover 226R that are included in the vehicle body cover 22. The right protecting portion may include a plurality of rods or a group of fins, as long as at least a portion of the right protecting portion is disposed above the center CR in the up-down direction of the vehicle body frame 21 between the upper end WUR of the right front wheel 31 and the lower edge MDER of the link mechanism 5 or the steering mechanism 7 that is directly above the right front wheel 31, and is disposed below the right lower edge CDER of the front portion 221a of the front cover 221, as seen from the front in the front-rear direction of the vehicle body frame 21 when the vehicle body frame 21 is in the upright state. Here, the material of the right protecting portion is not limited to resins but metals or the like may be used.

The portion that defines and serves as the left protecting portion does not have to be the left front fender 223L or the left protecting cover 226L that are included in the vehicle body cover 22. The left protecting portion may include a plurality of rods or a group of fins, as long as at least a portion of the left protecting portion is disposed above the center CL in the up-down direction of the vehicle body frame 21 between the upper end WUL of the left front wheel 32 and the lower edge MDEL of the link mechanism 5 or the steering mechanism 7 that is directly above the left front wheel 32, and is disposed below the left lower edge CDEL of the front portion 221a of the front cover 221, as seen from the front in the front-rear direction of the vehicle body frame 21 when the vehicle body frame 21 is in the upright state. Here, the material of the left protecting portion is not limited to resins but metals or the like may be used.

This application claims priority to Japanese Patent Application No. 2012-276254 filed on Dec. 18, 2012, the entire contents of which are incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
a vehicle body frame;
a handlebar configured to turn relative to the vehicle body frame;
a vehicle body cover at least a portion of which covers the vehicle body frame;
a right front wheel and a left front wheel arranged side by side in a left-right direction of the vehicle body frame;
a steering mechanism configured to transmit a turning motion of the handlebar to the right front wheel and the left front wheel; and
a link mechanism disposed above the right front wheel and the left front wheel, and configured to cause the vehicle body frame to lean relative to a vertical direction by changing positions of the right front wheel and the left front wheel relative to the vehicle body frame; wherein the vehicle body cover includes:

a link cover portion covering at least a portion of the link mechanism, configured to not be displaced relative to the vehicle body frame, including a front portion disposed forward of respective rear ends of the right front wheel and the left front wheel in a front-rear direction of the vehicle body frame, and as seen from the front in the front-rear direction of the vehicle body frame when the vehicle body frame is in an upright state, arranged such that a right lower edge of the front portion directly above the right front wheel is disposed above a lower end of the link mechanism or the steering mechanism in an up-down direction of the vehicle body frame, and such that a left lower edge of the front portion located in an upper side of the left front wheel is disposed above a lower end of the link mechanism or the steering mechanism in the up-down direction of the vehicle body frame;

a right protecting portion is configured to be displaced relative to the vehicle body frame in accordance with an operation of the link mechanism, at least a portion of the right protecting portion is disposed above a center in the up-down direction of the vehicle body frame between an upper end of the right front wheel and a lower edge of the link mechanism or the steering mechanism directly above the right front wheel, and is disposed below the right lower edge of the front portion of the link cover portion as seen from the front in the front-rear direction when the vehicle body frame is in the upright state; and a left protecting portion configured to be displaced relative to the vehicle body frame in accordance with the operation of the link mechanism, at least a portion of the left protecting portion is disposed above a center in the up-down direction of the vehicle body frame between an upper end of the left front wheel and a lower edge of the link mechanism or the steering mechanism directly above the left front wheel, and is disposed below the left lower edge of the front portion of the link cover portion as seen from the front in the front-rear direction when the vehicle body frame is in the upright state.

2. The vehicle as set forth in claim 1, wherein at least a portion of the right protecting portion is disposed below the center in the up-down direction of the vehicle body frame between the upper end of the right front wheel and the lower edge of the link mechanism or the steering mechanism directly above the right front wheel, and is disposed above an upper edge of the right front wheel as seen from the front in the front-rear direction when the vehicle body frame is in the upright state; and at least a portion of the left protecting portion is disposed below the center in the up-down direction of the vehicle body frame between the upper end of the left front wheel and the lower edge of the link mechanism or the steering mechanism directly above the left front wheel, and is disposed above an upper edge of the left front wheel as seen from the front in the front-rear direction when the vehicle body frame is in the upright state.

3. The vehicle as set forth in claim 1, wherein at least a portion of the right protecting portion is disposed behind a front end of the right front wheel in the front-rear direction when the vehicle body frame is in the upright state; and at least a portion of the left protecting portion is disposed behind a front end of the left front wheel in the front-rear direction when the vehicle body frame is in the upright state.

4. The vehicle as set forth in claim 1, wherein at least a portion of the right protecting portion is disposed forward of in the front-rear direction of the vehicle body frame than a rear end of the right front wheel when the vehicle body frame is in the upright state; and at least a portion of the left protecting portion is disposed forward of in the front-rear direction of the vehicle body frame than a rear end of the left front wheel when the vehicle body frame is in the upright state.

5. The vehicle as set forth in claim 1, wherein the steering mechanism includes:

a right shock absorber supporting the right front wheel at a lower portion thereof, and configured to buffer displacement of the right front wheel in the up-down direction of the vehicle body frame relative to an upper portion thereof;

a left shock absorber supporting the left front wheel at a lower portion thereof, and configured to buffer displacement of the left front wheel in the up-down direction of the vehicle body frame relative to an upper portion thereof;

a right bracket to which the upper portion of the right shock absorber is fixed;

a left bracket to which the upper portion of the left shock absorber is fixed;

a steering shaft to which the handlebar is attached; and a transmission mechanism configured to transmit a turning motion of the steering shaft to the right bracket and the left bracket; wherein the right protecting portion is fixed to any one of the link mechanism, the right shock absorber, the right bracket, and the transmission mechanism; and the left protecting portion is fixed to any one of the link mechanism, the left shock absorber, the left bracket, and the transmission mechanism.

6. The vehicle as set forth in claim 5, wherein the right protecting portion is fixed to the upper portion of the right shock absorber, and the left protecting portion is fixed to the upper portion of the left shock absorber.

7. The vehicle as set forth in claim 1, wherein a front edge of the right protecting portion is inclined such that at least one of an upper end thereof and a lower end thereof is located behind a front end thereof as seen from a side of the vehicle body frame when the vehicle body frame is in the upright state; and a front edge of the left protecting portion is inclined such that at least one of an upper end thereof and a lower end thereof is located behind a front end thereof as seen from the side of the vehicle body frame when the vehicle body frame is in the upright state.

8. The vehicle as set forth in claim 1, wherein a front edge of the right protecting portion is inclined that at least one of a right end thereof and a left end thereof is located behind a front end thereof as seen from above the vehicle body frame when the vehicle body frame is in the upright state; and a front edge of the left protecting portion is inclined such that at least one of a right end thereof and a left end thereof is located behind a front end thereof as seen from above the vehicle body frame when the vehicle body frame is in the upright state.

9. The vehicle as set forth in claim 1, wherein the right protecting portion covers at least a portion of an upper surface of the right front wheel is configured to provide a function of preventing objects including muddy water kicked up by the right front wheel from scattering; and the left protecting portion covers at least a portion of an upper surface of the left front wheel and is configured to provide a function of preventing objects including muddy water kicked up by the left front wheel from scattering.

\* \* \* \* \*